(12) United States Patent
Furukawa et al.

(10) Patent No.: US 8,885,369 B2
(45) Date of Patent: Nov. 11, 2014

(54) POWER REGENERATION DEVICE, METHOD OF REGENERATING POWER, POWER STORAGE SYSTEM, METHOD OF STORING POWER, AND HIGH FREQUENCY DEVICE

(75) Inventors: Minoru Furukawa, Tokyo (JP); Tadashi Shirato, Tokyo (JP)

(73) Assignee: Nihon Dengyo Kosaku Co., Ltd., Tokyo (JP)

( * ) Notice: Subject to any disclaimer, the term of this patent is extended or adjusted under 35 U.S.C. 154(b) by 209 days.

(21) Appl. No.: 13/505,153

(22) PCT Filed: Oct. 27, 2010

(86) PCT No.: PCT/JP2010/069098
§ 371 (c)(1),
(2), (4) Date: Apr. 30, 2012

(87) PCT Pub. No.: WO2011/052653
PCT Pub. Date: May 5, 2011

(65) Prior Publication Data
US 2012/0218799 A1    Aug. 30, 2012

(30) Foreign Application Priority Data
Oct. 29, 2009 (JP) ................. 2009-249467

(51) Int. Cl.
| | | |
|---|---|---|
| H02M 1/12 | (2006.01) | |
| H02M 1/14 | (2006.01) | |
| H05B 6/72 | (2006.01) | |
| H02J 17/00 | (2006.01) | |
| H05B 6/74 | (2006.01) | |
| H05B 6/70 | (2006.01) | |
| H05B 6/80 | (2006.01) | |

(52) U.S. Cl.
CPC .. *H05B 6/80* (2013.01); *H05B 6/72* (2013.01); *H02J 17/00* (2013.01); *H05B 6/74* (2013.01); *H05B 6/705* (2013.01)
USPC .......................................... 363/44

(58) Field of Classification Search
USPC ......... 363/81, 84, 88, 89, 124, 125, 126, 127, 363/39, 44–45
See application file for complete search history.

(56) References Cited

U.S. PATENT DOCUMENTS

| | | |
|---|---|---|
| 4,434,347 A * | 2/1984 | Kurtz et al. ............. 219/56.22 |
| 5,771,444 A | 6/1998 | Dent et al. |

(Continued)

FOREIGN PATENT DOCUMENTS

| | | |
|---|---|---|
| CN | 101154823 A | 4/2008 |
| CN | 101295887 A | 10/2008 |

(Continued)

OTHER PUBLICATIONS

International Search Report issued Jan. 25, 2011 in PCT/JP2010/069098.

(Continued)

*Primary Examiner* — Adolf Berhane
*Assistant Examiner* — Jeffrey Gblende
(74) *Attorney, Agent, or Firm* — Oblon, Spivak, McClelland, Maier & Neustadt, L.L.P.

(57) ABSTRACT

A power regeneration device includes an extraction unit and a high frequency-to-DC converter. The extraction unit is provided on a transmission path. The transmission path is provided for transmitting a high-frequency wave from a high-frequency wave source to a high-frequency load. The extraction unit extracts a reflected high-frequency wave generated by reflecting the high-frequency wave from the high-frequency load. The high frequency-to-DC converter converts the reflected high-frequency wave extracted by the extraction unit into DC power.

14 Claims, 12 Drawing Sheets

(56) References Cited

U.S. PATENT DOCUMENTS

| | | |
|---|---|---|
| 7,092,684 B2 * | 8/2006 | Szopko et al. ............. 455/114.2 |
| 8,020,314 B2 * | 9/2011 | George et al. .................... 34/259 |
| 2004/0242166 A1 * | 12/2004 | Ikuma ............................. 455/78 |
| 2006/0081624 A1 * | 4/2006 | Takada et al. ................. 219/716 |
| 2006/0124244 A1 * | 6/2006 | Ishii et al. ................ 156/345.42 |
| 2008/0266012 A1 | 10/2008 | Yahata et al. |
| 2008/0268796 A1 * | 10/2008 | Fukuda et al. ............. 455/127.1 |
| 2009/0244934 A1 * | 10/2009 | Wang et al. ................ 363/21.06 |

FOREIGN PATENT DOCUMENTS

| | | |
|---|---|---|
| EP | 1986335 A2 | 10/2008 |
| JP | 2006-17407 | 1/2006 |
| JP | 2006-128075 | 5/2006 |
| JP | 2008-278096 | 11/2008 |
| JP | 2008-278097 | 11/2008 |

OTHER PUBLICATIONS

Micro Denshi Co., Ltd., "Microwave devices, Isolator [online]", http://www.microdenshi.co.jp/isolator.html, Oct. 9, 2009, 3 pages with English translation.

Norio Kai, "UHF band water road for particle accelerator", SPC Technical Report No. 17, SPC Electronics Corporation, Mar. 15, 2006, pp. 30-35 with partial English translation.

TDK Corporation, "Product catalog, Circulators/Isolators, Base station use, Ferrite-substrate type [online]", http://www.tdk.co.jp/tjfx01/j773_cu.pdf, Oct. 9, 2009, 1 page with English translation.

Office Action issued on Jan. 21, 2014 in the corresponding Chinese Patent Application No. 201080048960.5.

European Search Report issued Jul. 30, 2014 in European Patent Application EP 10 82 6785 (in English).

* cited by examiner

POWER REGENERATION DEVICE, METHOD OF REGENERATING POWER, POWER STORAGE SYSTEM, METHOD OF STORING POWER, AND HIGH FREQUENCY DEVICE

FIELD

The disclosure relates to a power regeneration device and method for regenerating high-frequency electric power, to a power storage system and method for storing the high-frequency electric power, and to a high frequency device.

BACKGROUND

FIG. 23 is a block diagram of a configuration of a high-frequency heating device which is an example of a high frequency device. This high-frequency heating device 500 includes a high frequency generator 1 serving as a high frequency source that generates microwaves and a heating chamber 6 serving as a high frequency load. The high frequency generator 1 includes, for example, a magnetron being a microwave generator, a power unit, a control circuit, etc. The high frequency generator 1 and the heating chamber 6 are connected through a waveguide 2, which is a transmission path for transmitting high-frequency waves. A circulator 3, a power monitor 4, and a matching unit 5 are sequentially provided on the waveguide 2.

The operation of the high-frequency heating device 500 will be described. The high frequency generator 1 generates microwaves W of 2.4 to 2.5 GHz corresponding to the absorption band of water. The microwaves W are transmitted through the waveguide 2, pass sequentially through the circulator 3, the power monitor 4, and the matching unit 5, and reach the heating chamber 6. The power monitor 4 monitors the intensity of the microwaves W passing therethrough and displays the monitored intensity. The matching unit 5 is used to match the impedance of the waveguide 2 to the impedance of the heating chamber 6.

FIG. 24 is a diagram illustrating the heating of a heating object O in the heating chamber 6 shown in FIG. 23. The heating chamber 6 includes: a turntable 6a on which the heating object O containing water is placed; a stirrer fan 6b for randomly reflecting the microwaves W; and an electric heater 6c for oven heating. In the heating chamber 6, the microwaves W introduced from the waveguide 2 connected to the matching unit 5 are absorbed by the heating object O on the rotating turntable 6a while being reflected by inner walls 6d of the heating chamber 6 and also randomly reflected by the stirrer fan 6b, and the heating object O is thereby heated. In the heating chamber 6, the heating object O can also be oven-heated by applying heat H to the heating object O using the electric heater 6c.

Microwaves W not used to heat the heating object O in the heating chamber 6 are outputted to the waveguide 2 as reflected microwaves RW having the same frequency as that of the microwaves W. Then, the reflected microwaves RW return through the waveguide 2, pass sequentially through the matching unit 5 and the power monitor 4, and reach the circulator 3, as shown in FIG. 23.

The circulator 3 includes a first port 3a, a second port 3b, and a third port 3c and has the function of outputting the microwaves W inputted from the first port 3a to the second port 3b and outputting the reflected microwaves RW inputted from the second port 3b to the third port 3c. As described above, the circulator 3 has the function of preventing the reflected microwaves RW from returning to the high frequency generator 1 to prevent, for example, damage to and unstable operation of the high frequency generator 1.

A load referred to as a dummy load 7 is connected to the third port 3c of the circulator 3. The dummy load 7 is configured such that the reflected microwaves RW outputted from the third port 3c are absorbed by an absorber to convert the electric power of the reflected microwaves RW to heat, so that the electric power is disposed of as heat. When the electric power of the reflected microwaves RW is high, the amount of heat generated is also large. Therefore, cooling means such as a cooling fan is provided in the dummy load (see Non Patent Literature 1). The circulator to which such a dummy load is connected is widely used not only in high frequency heating devices but also in high frequency devices for particle accelerators and radio communication devices (See Non Patent Literatures 2 and 3).

CITATION LIST

Non Patent Literature

Non Patent Literature 1: Microwave devices, Isolator [online] Micro Denshi Co., Ltd., [Searched on Heisei 21 October 9], Internet <URL:http://www.microdenshi.co.jp/isolator.html>

Non Patent Literature 2: Norio Kai, "UHF band water road for particle accelerator," SPC Technical Report No. 17 (2006), SPC ELECTRONICS CORPORATION, issued: 2006 Mar. 15, pp. 30 to 35

Non Patent Literature 3: Product catalog, Circulators/isolators, Base station use, Ferrite-substrate type, [online], TDK Corporation, [Searched on Heisei 21 October 9], Internet <URL:http://www.tdk.co.jp/tjfx01/j773_cu.pdf>

SUMMARY

Technical Problem

However, in a conventional high frequency device with a dummy load, the efficiency of utilization of energy is low because the electric power of reflected high-frequency waves reflected back from a high-frequency load is converted to heat by the dummy load and the heat is simply dissipated and disposed of. Particularly, when cooling means such as a cooling fan or cooling water is provided for the dummy load because the electric power of the reflected high-frequency waves is high, electric power for operating the cooling means is needed, and this further reduces the energy efficiency.

Accordingly, there is a need to provide a power regeneration device and method for regenerating high-frequency power to allow the power to be used efficiently, a power storage system and method for storing high-frequency power to allow the power to be efficiently used, and a high frequency device that can utilize high-frequency power efficiently.

Solution to Problem

In some embodiments, a power regeneration device includes: an extraction unit provided on a transmission path, the transmission path being provided for transmitting a high-frequency wave from a high-frequency wave source to a high-frequency load, the extraction unit extracting a reflected high-frequency wave generated by reflecting the high-frequency wave from the high-frequency load; and a high frequency-to-DC converter for converting the reflected high-frequency wave extracted by the extraction unit into DC power.

The power regeneration device further includes a branching unit that branches and outputs the reflected high-frequency wave extracted by the extraction unit.

In the power regeneration device, the high frequency-to-DC converter includes: an antenna unit for receiving the reflected high-frequency wave and outputting AC power corresponding to the received reflected high-frequency wave; and a rectifying unit for rectifying the AC power outputted from the antenna unit.

In the power regeneration device, the high frequency-to-DC converter includes: a plurality of antenna units; and a reflected high-frequency wave transmission path for transmitting the reflected high-frequency wave, wherein the plurality of antenna units is distributed and arranged such that the reflected high-frequency wave transmitted through the reflected high-frequency wave transmission path is received by each of the antenna units.

In the power regeneration device, the reflected high-frequency wave transmission path includes a radial waveguide.

In the power regeneration device, the high frequency-to-DC converter includes a vacuum tube for converting the reflected high-frequency wave into DC power.

In the power regeneration device, the extraction unit includes a circulator having a first port to which the high-frequency wave generated by the high-frequency wave source is inputted, a second port from which the inputted high-frequency wave is outputted to the high-frequency load and to which the reflected high-frequency wave is inputted, and a third port from which the inputted reflected high-frequency wave is outputted.

The power regeneration device further includes a voltage control unit for controlling a voltage of the DC power outputted from the high frequency-to-DC converter to a predetermined voltage and outputs the power.

In some embodiments, a power storage system includes the power regeneration device and a power storage unit for storing DC power outputted from the power regeneration device.

In some embodiments, a high frequency device includes: a high-frequency wave source; a high-frequency load; a transmission path for transmitting a high-frequency wave from the high-frequency wave source to the high-frequency load; and the power regeneration device or the power storage system, provided on the transmission path.

In the high frequency device, the high-frequency load is a heating chamber for high-frequency heating.

In the high frequency device, the high-frequency load is an antenna for receiving and transmitting a high-frequency signal wave.

In some embodiments, a method of regenerating power includes: an extracting step of extracting a reflected high-frequency wave on a transmission path, the transmission path being provided for transmitting a high-frequency wave from a high-frequency wave source to a high-frequency load, the reflected high-frequency wave being generated by reflecting the high-frequency wave from the high-frequency load; and a high frequency-to-DC converting step of converting the extracted reflected high-frequency wave into DC power.

The method of regenerating power further includes a branching step of branching the extracted reflected high-frequency wave, wherein in the high frequency-to-DC converting step, the branched reflected high-frequency wave is converted into the DC power.

In the method of regenerating power, the high frequency-to-DC converting step includes: a receiving step of receiving the reflected high-frequency wave and outputting AC power corresponding to the received reflected high-frequency wave; and a rectifying step of rectifying the outputted AC power.

According to the method of regenerating power, in the receiving step, the extracted reflected high-frequency wave is received by a plurality of antennas distributed and arranged on a reflected high-frequency wave transmission path while the extracted reflected high-frequency wave is transmitted through the reflected high-frequency wave transmission path.

According to the method of regenerating power, in the receiving step, the reflected high-frequency wave transmission path including a radial waveguide is used.

The method of regenerating power further includes a voltage controlling step of controlling a voltage of the DC power outputted in the high frequency-to-DC converting step to a predetermined voltage and outputting the power.

In some embodiments, a method of storing power includes storing the DC power regenerated by the method of regenerating power.

Advantageous Effects of Invention

According to some embodiments, high-frequency power that has conventionally been disposed of as heat can be regenerated. Therefore, a power regeneration device and method that allow efficient use of high frequency power, a power storage system and method for storing high-frequency power to allow the power to be efficiently used, and a high frequency device that can efficiently utilize high-frequency power, can be achieved.

DESCRIPTION OF EMBODIMENTS

Figure 1:
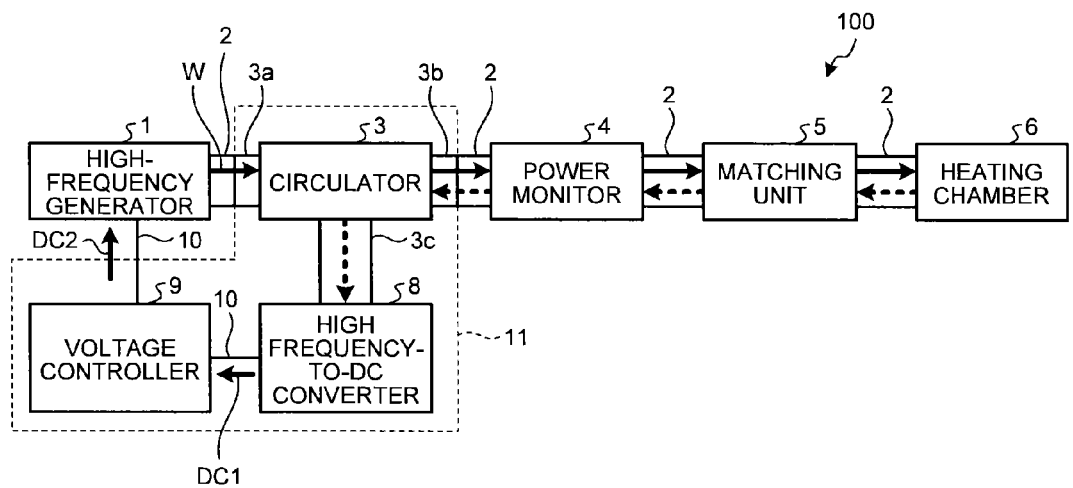
FIG. 1 is a block diagram illustrating a configuration of a high frequency heating device according to a first embodiment.

Embodiments of a power regeneration device and method, a power storage system and method, and a high frequency device according to the present invention will next be described in detail with reference to the drawings. However, the present invention is not limited to these embodiments. In the drawings, the same or corresponding elements are denoted appropriately by the same reference numerals. The drawings are only schematic, and it should be noted that the relation between the thickness and width of each layer, the ratio of respective layers, etc. may be different from actual values. Different drawings may contain identical portions with different dimensional relations and ratios.

First Embodiment

A high frequency heating device as a high frequency device according to a first embodiment of the present invention will first be described. FIG. 1 is a block diagram illustrating a configuration of the high frequency heating device according to the first embodiment. This high frequency heating device 100, as in the high-frequency heating device 500 shown in FIG. 21, includes a high frequency generator 1 and a heating chamber 6. The high frequency generator 1 is connected to the heating chamber 6 through a waveguide 2, which is a transmission path for transmitting high-frequency waves. A circulator 3, a power monitor 4, and a matching unit 5 are sequentially provided on the waveguide 2.

The high frequency heating device 100 further includes a high frequency-to-DC converter 8 connected to a third port 3c of the circulator 3 and a voltage controller 9 connected to the high frequency-to-DC converter 8. The circulator 3, the high frequency-to-DC converter 8, and the voltage controller 9 constitute a power regeneration device 11. The high frequency-to-DC converter 8 and the voltage controller 9 are connected to each other through a power line 10, and the voltage controller 9 and the high frequency generator 1 are connected to each other through the power line 10.

The operation of the high frequency heating device 100 and the power regeneration device 11 will next be described. The high frequency generator 1 generates microwaves W having a frequency of 2.4 to 2.5 GHz. The microwaves W are transmitted through the waveguide 2, pass sequentially through the circulator 3, the power monitor 4, and the matching unit 5, and reach the heating chamber 6. The circulator 3 outputs the microwaves W inputted from its first port 3a to its second port 3b.

Figure 24:
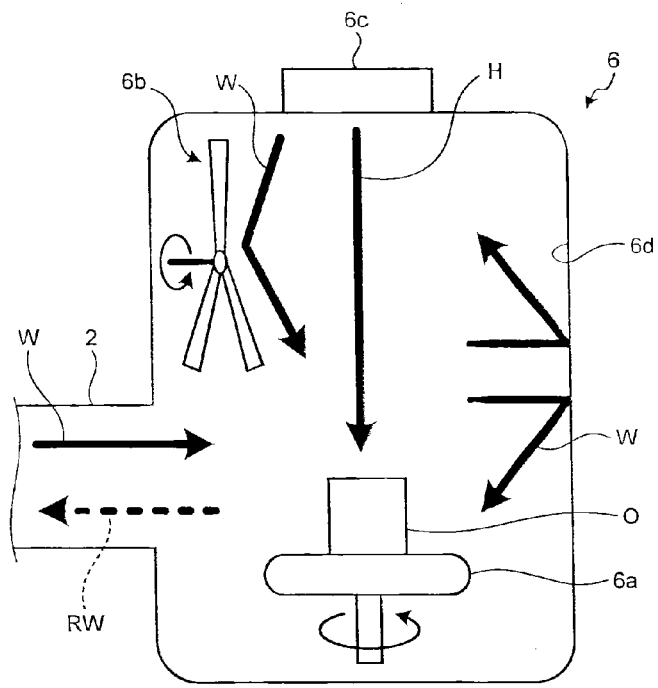
FIG. 24 is a diagram illustrating heating of a heating object in a heating chamber shown in FIG. 23.

The heating chamber 6 functions similarly to the high-frequency heating device 500. More specifically, as shown in FIG. 24, the microwaves W introduced from the waveguide 2 connected to the matching unit 5 are absorbed by the water-containing heating object O placed on the rotating turntable 6a while being reflected by the inner walls 6d of the heating chamber 6 and also randomly reflected by the stirrer fan 6b, and the heating object O is thereby heated. The heating object O can also be oven-heated by applying heat H to the object using the electric heater 6c.

Microwaves W not used to heat the heating object O in the heating chamber 6 are outputted to the waveguide 2 as reflected microwaves RW having the same frequency as that of the microwaves W. Then, the reflected microwaves RW sequentially pass through the matching unit 5 and the power monitor 4 and reach the circulator 3.

The circulator 3 outputs the reflected microwaves RW inputted from the second port 3b through the third port 3c. More specifically, the circulator 3 functions as an extraction unit for extracting the reflected microwaves RW from the waveguide 2 connecting the high frequency generator 1 to the heating chamber 6.

The high frequency-to-DC converter 8 converts the reflected microwaves RW extracted by the circulator 3 to DC power DC1 and outputs the DC power DC1. The DC power DC1 is inputted to the voltage controller 9 through the power line 10.

The voltage controller 9 controls the voltage of the inputted DC power DC1 to a predetermined voltage and outputs the power as DC power DC2. The DC power DC2 is inputted to the high frequency generator 1 through the power line 10 and is used as part of electric power for, for example, generating the microwaves W in the high frequency generator 1.

More specifically, the power regeneration device 11 is configured such that the reflected microwaves RW extracted by the circulator 3 are regenerated as the DC power DC1 and the DC power DC2 with a predetermined voltage controlled according to the DC power DC1 is outputted so that the DC power DC2 can be re-used as electric power for operating the high frequency generator 1. Therefore, in the high frequency heating device 100, the power regeneration device 11 is used to effectively utilize the electric power of the reflected microwaves RW that has conventionally been disposed of simply as heat, so that the effective use of energy can be achieved. Since the high frequency heating device 100 can reduce the amount used of electric power, the operating cost of the device can be reduced, and this is preferred in terms of energy saving and ecology.

Figure 2:
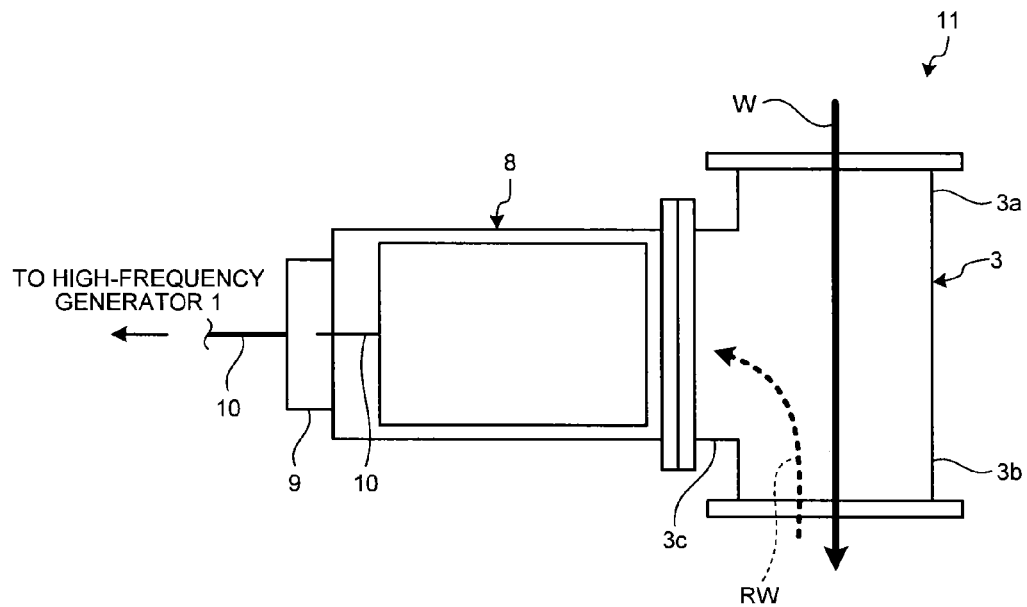
FIG. 2 is a schematic diagram of a main part of a power regeneration device shown in FIG. 1.

The detailed configuration of the power regeneration device 11 will next be described. FIG. 2 is a schematic diagram of the power regeneration device 11 shown in FIG. 1. As shown in FIG. 2, the circulator 3 includes a waveguide having, for example, a rectangular cross-section and has: a first port 3a to which the microwaves W are inputted; a second port 3b from which the microwaves W inputted from the first port 3a are outputted and to which the reflected microwaves RW are inputted; and a third port 3c from which the reflected microwaves RW inputted from the second port 3b are outputted. The high frequency-to-DC converter 8 is connected to the third port 3c. The voltage controller 9 is provided at one end of the high frequency-to-DC converter 8 and connected to the high frequency-to-DC converter 8 and to the high frequency generator 1 through the power line 10.

Figure 3:
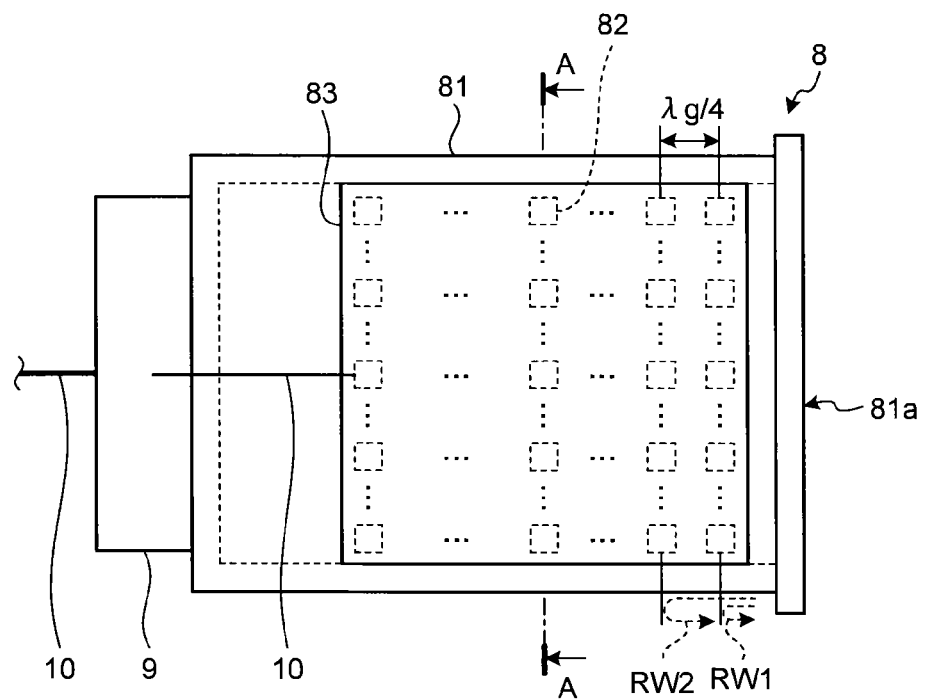
FIG. 3 is a schematic plan view of a high frequency-to-DC converter and a voltage controller shown in FIG. 2.
Figure 4:
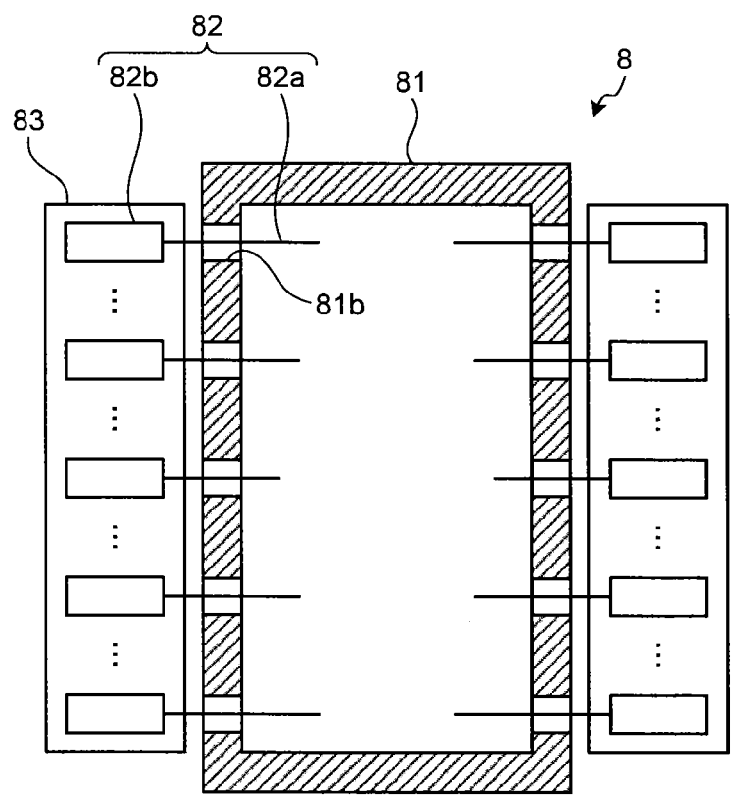
FIG. 4 is a sectional view of the high frequency-to-DC converter taken along lines A-A in FIG. 3.
Figure 5:
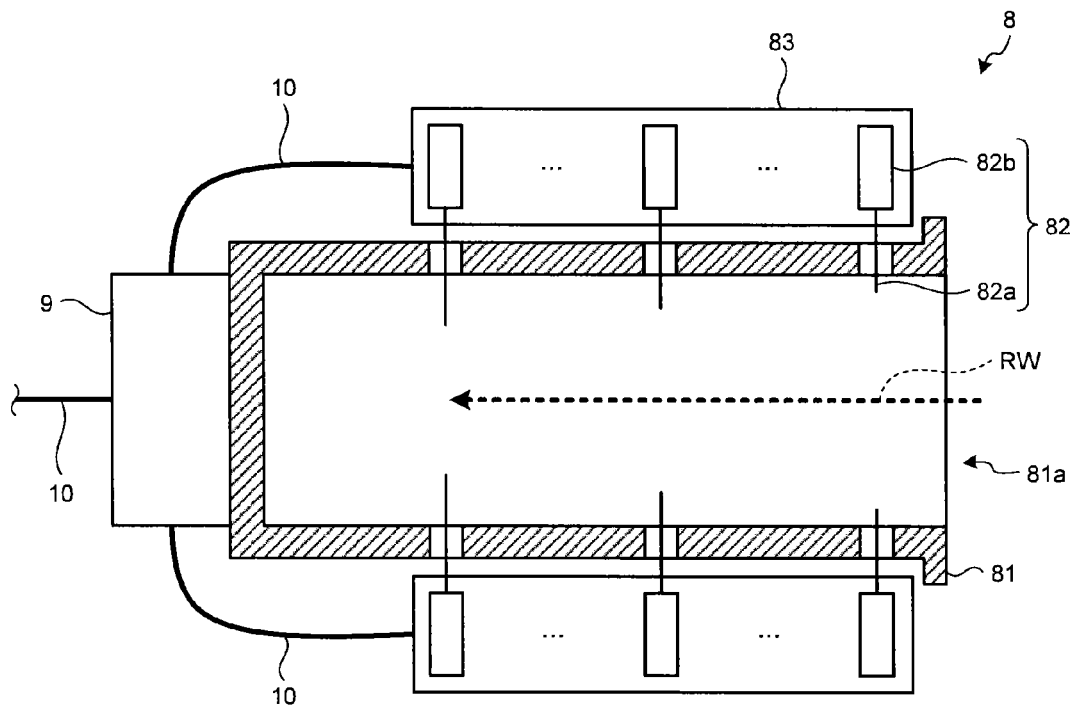
FIG. 5 is a partial side cross-sectional view of the high frequency-to-DC converter shown in FIG. 3.

FIG. 3 is a schematic plan view of the high frequency-to-DC converter 8 and the voltage controller 9 shown in FIG. 2. FIG. 4 is a sectional view of the high frequency-to-DC converter 8 taken along lines A-A in FIG. 3. FIG. 5 is a partial cross-sectional side view of the high frequency-to-DC converter 8 shown in FIG. 3.

As shown in FIGS. 3 to 5, the high frequency-to-DC converter 8 includes a waveguide 81, a plurality of rectenna (rectifying antenna) elements 82 each having a rod-shaped antenna probe 82a serving as an antenna unit and a rectifying unit 82b, and a casing 83 for containing the rectifying units 82b. Each rectifying unit 82b is connected to the power line 10.

The waveguide 81 has a rectangular cross-section taken along line A-A perpendicular to its lengthwise direction. The waveguide 81 is connected to the third port 3c at its opening 81a and functions as a reflected high-frequency wave transmission path for transmitting the reflected microwaves RW extracted from the third port 3c. A large number of holes 81b arranged in a lattice form are formed on opposite lengthwise sides in the cross-section of the waveguide 81. The rectenna elements 82 are distributed and arranged in a lattice form at positions corresponding to the positions of the holes 81b of the waveguide 81. The antenna probes 82a are inserted into the holes 81b and protrude inside the waveguide 81.

The reflected microwaves RW inputted to the waveguide 81 through the opening 81a are transmitted in the lengthwise direction of the waveguide 81 while an electric field distribution corresponding to the cross-sectional shape of the waveguide 81 is formed, as shown in FIG. 5. The antenna probes 82a receive the transmitting reflected microwaves RW and output AC power corresponding to the received electric power.

As described above, the rectenna elements 82 are distributed and arranged on the opposite lengthwise sides of the waveguide 81. The reflected microwaves RW transmitted through the waveguide 81 in its lengthwise direction are sequentially received by each of the antenna probes 82a of the rectenna elements 82 at their arrangement positions. As a result, the electric power of the reflected microwaves RW can be efficiently obtained. In addition, since the permissible reception power of one rectenna element 82 can be reduced, the high frequency-to-DC converter 8 with high permissible reception power can be configured at low cost using low-cost rectenna elements 82.

The lengths of the respective antenna probes 82a are set according to the electric field intensity distribution of the reflected microwaves RW in the waveguide 81. Specifically, the lengths of antenna probes 82a located at positions at which the electric field intensity is high are set to be small, and the lengths of antenna probes 82a located at positions at which the electric field intensity is low are set to be large.

More specifically, in the cross-section of the waveguide 81 shown in FIG. 4, the reflected microwaves RW are distributed such that the electric field intensity is highest in the central portion of the cross-section of the waveguide 81 and decreases toward the circumference. Accordingly, the lengths of the antenna probes 82a are set to be small in the central portion of the cross-section and to increase toward the circumference. In the direction of transmission of the reflected microwaves RW shown in FIG. 5, the electric field intensity is highest at the opening 81a and gradually decreases as the reflected microwaves RW are transmitted in the waveguide 81. This is mainly because of transmission loss and loss due to sequential reception by the antenna probes 82a. Accordingly, the lengths of the antenna probes 82a are set to be small at the opening 81a and to increase in the direction of transmission of the reflected microwaves RW.

By setting the lengths of the antenna probes 82a according to the distribution of the electric field intensity in the waveguide 81, the amounts of the electric power of the reflected microwaves RW received by the antenna probes 82a become equal, and equal amounts of AC power can be generated accordingly. Therefore, equal amounts of AC power are applied to the respective rectifying units 82b connected to the respective antenna probes 82a, and this can prevent a large load from being applied to a certain rectifying unit 82b.

In the first embodiment, the waveguide 81 having a rectangular cross-section is used. However, for example, a cylindrical waveguide having a circular cross-section may be used. When such a cylindrical waveguide is used, the electric field intensity of the reflected microwaves RW is distributed isotropically in the circumferential direction of the cylindrical waveguide. Therefore, by setting the lengths of antenna probes arranged on the same circumferential circle of the cylindrical waveguide to the same value, the amounts of the electric power of the reflected microwaves RW received by these antenna probes become equal.

If part of the reflected microwaves RW is reflected by the respective antenna probes 82a and the reflected waves return to the circulator 3 and are inputted to the high frequency generator 1, this may cause a fear of unstable operation of the high frequency generator 1. However, in the first embodiment, the intervals of the antenna probes 82a arranged in the lengthwise direction of the waveguide 81 are set to $\lambda g/4$, where $\lambda g$ is the wavelength of the reflected microwaves RW in the waveguide 81, as shown in FIG. 3. This can prevent the fear described above. More specifically, let the components of the reflected microwaves RW reflected by two antenna probes 82a adjacent in the lengthwise direction be reflected microwaves RW1 and RW2, as shown in FIG. 3. Then the path difference between the reflected microwaves RW1 and RW2 is given by $2 \times \lambda g/4 = \lambda g/2$, and the phase difference is $(2\pi/\lambda g) \times (\lambda g/2) = \pi$. Therefore, when the reflected microwaves RW1 and RW2 overlap, they cancel each other out. As a result, the reflected microwaves RW1 and RW2 are prevented from returning to the circulator 3, and the unstable operation, for example, of the high frequency generator 1 is thereby prevented.

The settings of the lengths and arrangement of the antenna probes 82a are not limited to those in the first embodiment. For example, the lengths of antenna probes 82a located at positions at which the electric field intensity of the reflected microwaves RW is high may be set to be larger, or such antenna probes 82a may be arranged at a higher density. In such cases, a larger amount of high-frequency power is received at positions at which the electric field intensity is high.

Figure 6:
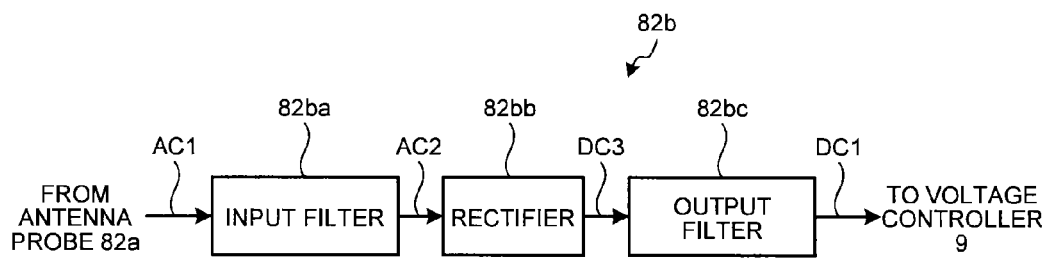
FIG. 6 is a block diagram illustrating a configuration of a rectifying unit.

The rectifying units 82b of the rectenna elements 82 will next be described. The rectifying units 82b have the function of converting the AC power outputted from the antenna probes 82a to DC power. FIG. 6 is a block diagram illustrating a configuration of each rectifying unit 82b. As shown in FIG. 6, the rectifying unit 82b includes an input filter 82ba, a rectifier 82bb, and an output filter 82bc that are sequentially connected to one another.

The operation of the rectifying unit 82b will next be described. The input filter 82ba receives the inputted AC power AC1 outputted from the antenna probe 82a, removes frequency components other than the frequency components of the reflected microwaves RW from the AC power AC1, and outputs the power as AC power AC2.

The rectifier 82*bb* rectifies the AC power AC2 outputted from the input filter 82*ba* and outputs the rectified power as DC power DC3. The DC power DC3 also contains harmonic components associated with the frequency of the reflected microwaves RW, the harmonic components being generated when the rectifier 82*bb* rectifies the AC power AC2.

The output filter 82*bc* removes the harmonic components contained in the DC power DC3 outputted from the rectifier 82*bb* and outputs the power as DC power DC1. As described above, the reflected microwaves RW extracted by the circulator 3 are regenerated as the DC power DC1.

The harmonic components generated in the rectifier 82*bb* are outputted also to the input filter 82*ba* but are blocked by the input filter 82*ba*. Therefore, the harmonics are prevented from being transmitted from the antenna probe 82*a*, so that, for example, unstable operation of the high frequency generator 1 that can occur when the harmonics reach the high frequency generator 1 is prevented.

The input filter 82*ba* and the output filter 82*bc* can be implemented using band-pass filters or low-pass filters that allow the frequency of the reflected microwaves RW to pass therethrough but block the harmonics. These filters can be configured using, for example, RLC circuits. The rectifier 82*bb* can be configured using, for example, a diode.

The voltage controller 9 will next be described. The voltage controller 9 has the function of controlling the voltage of the DC power DC1 outputted from the high frequency-to-DC converter 8 and outputting the power as DC power DC2 with a predetermined voltage.

Figure 7:
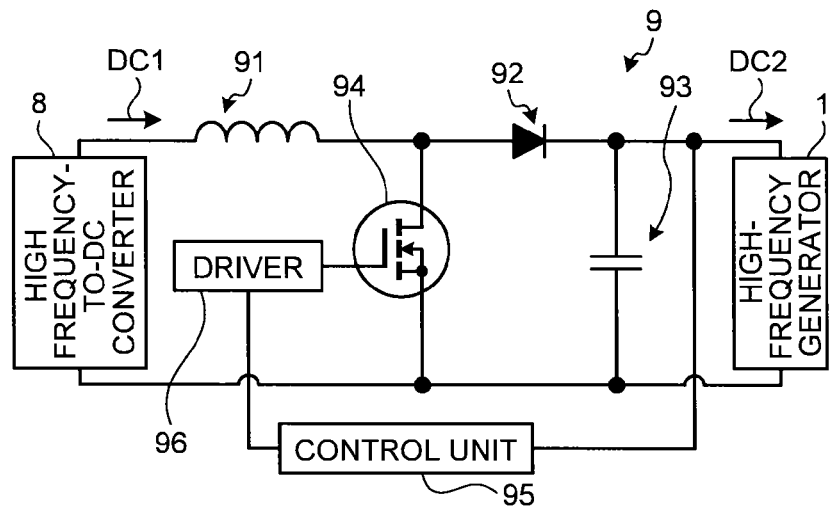
FIG. 7 is a diagram illustrating a exemplary circuit configuration of the voltage controller.

FIG. 7 is a diagram illustrating an exemplary circuit configuration of the voltage controller 9. The voltage controller 9 shown in FIG. 7 has the configuration of a step-up DC-DC converter including a coil 91, a diode 92, a capacitor 93, a field effect transistor (FET) 94, a control unit 95, and a driver 96. The control unit 95 is configured using, for example, an error amplifier to which a reference voltage has been inputted, and the driver 96 is configured using, for example, a PWM circuit.

The operation of the voltage controller 9 will next be described. When the voltage value of the DC power DC2 to be outputted to the high frequency generator 1 is inputted to the control unit 95, the control unit 95 compares the inputted voltage value with the reference voltage and outputs a control signal corresponding to the difference to the driver 96. The driver 96 performs the switching of the FET 94 by PWM control in response to the control signal so that the voltage of the DC power DC2 is controlled to the desired reference voltage value.

The voltage of the DC power DC1 outputted from the high frequency-to-DC converter 8 changes depending on the intensity of the electric power of the reflected microwaves RW received by the antenna probes 82*a*. However, the use of the voltage controller 9 allows the DC power DC2 with stabilized voltage to be supplied to the high frequency generator 1.

The voltage controller 9 shown in FIG. 7 has the configuration of the step-up DC-DC converter. However, the configuration of a step-down or a step-up and down DC-DC convertor may be appropriately used. Instead of the FET 94, another switching element such as a bipolar transistor may be used.

As described above, in the high frequency heating device 100 according to the first embodiment, the power regeneration device 11 allows efficient utilization of the electric power of the reflected microwaves RW that has conventionally been disposed of simply as heat, so that efficient utilization of energy can be achieved.

The efficiency ηtotal of recovery of the electric power of the microwaves in the high frequency heating device 100 can be calculated using the following equation (1):

$$\eta total = (1 - \eta heat) \times (1 - Lc) \eta rfdc \times \eta dcdc \quad (1).$$

Here, ηheat is the ratio of the electric power used to heat the heating object O to the electric power of the microwaves W supplied to the heating chamber 6. It is assumed that all the microwaves W not used for heating are converted to the reflected microwaves RW. Lc is the propagation loss of the reflected microwaves RW in a path from the heating chamber 6 to the waveguide 81. ηrfdc is the efficiency of conversion from the reflected microwaves RW to the DC power DC1 in the rectenna elements 82. ηdcdc is the conversion efficiency of the voltage controller 9.

In the equation (1), when, for example, ηheat is 50%, Lc is 10%, ηrfdc is 80%, and ηdcdc is 98%, then ηtotal is approximately 35%, and high power regeneration efficiency is achieved.

Second Embodiment

Figure 8:
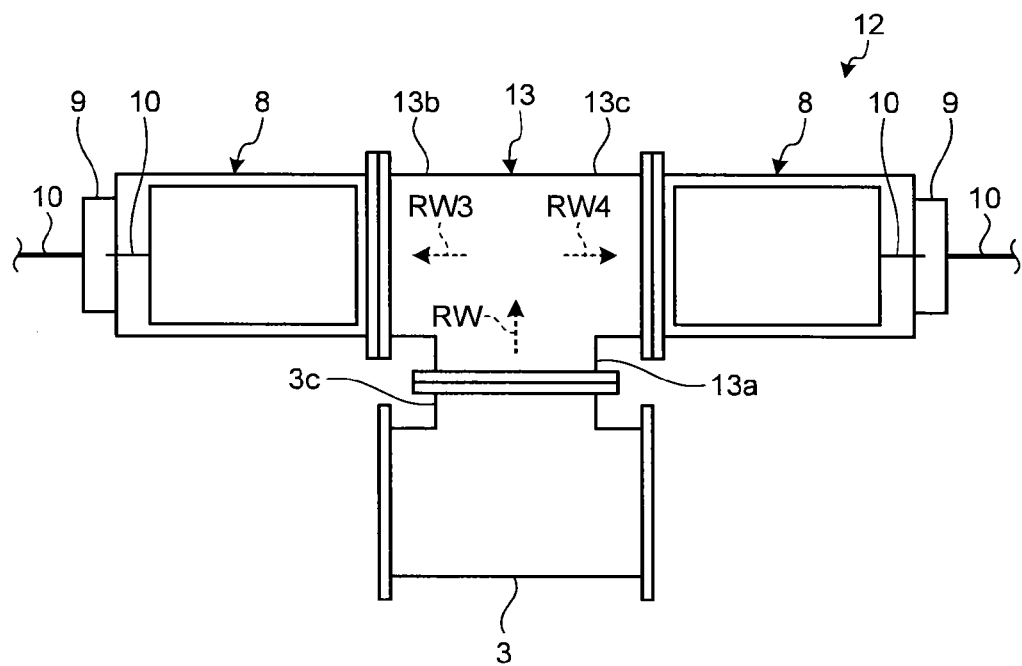
FIG. 8 is a schematic diagram illustrating a power regeneration device according to a second embodiment.

Another embodiment of the power regeneration device that can be used for the high frequency heating device 100 according to the first embodiment will next be described. FIG. 8 is a schematic diagram illustrating a power regeneration device according to a second embodiment. As shown in FIG. 8, a power regeneration device 12 includes a circulator 3, a T-branch waveguide 13 serving as a branching unit, two high frequency-to-DC converters 8, voltage controllers 9 connected to the respective high frequency-to-DC converters 8, and power lines 10. The T-branch waveguide 13 has a first port 13*a*, a second port 13*b*, and a third port 13*c*. The first port 13*a* is connected to the third port 3*c* of the circulator 3, and the high frequency-to-DC converters 8, the voltage controllers 9, and the power lines 10 are connected to the second port 13*b* and the third port 13*c*.

The operation of the power regeneration device 12 will next be described. In the T-branch waveguide 13, the reflected microwaves RW extracted by the circulator 3 and outputted from its third port 3*c* branch in two directions and are outputted from the second port 13*b* and the third port 13*c* as reflected microwaves RW3 and reflected microwaves RW4, respectively. Then the high frequency-to-DC converters 8, connected to the second port 13*b* and the third port 13*c*, respectively, convert the outputted reflected microwaves RW3 and RW4 into DC power, and the DC power is outputted to the voltage controllers 9 through the power lines 10. Then each voltage controller 9 controls the voltage of the inputted DC power to a predetermined voltage, and outputs the power to the high frequency generator 1 through each power line 10.

In this power regeneration device 12, since the electric power of the reflected microwaves RW3 and RW4 inputted to the respective high frequency-to-DC converters 8 is one-half the electric power of the reflected microwaves RW extracted by the circulator 3, the electric power of reflected microwaves RW that can be inputted to the power regeneration device 12 is twice the permissible value of the electric power of microwaves that can be inputted to each of the high frequency-to-DC converter 8. Therefore, although the high frequency-to-DC converters 8 used in the power regeneration device 12 are of the same type as that used in the power regeneration device 11 in the first embodiment, the dynamic range of the input electric power of the microwaves is two times wider than that in the power regeneration device 11.

Third Embodiment

Figure 9:
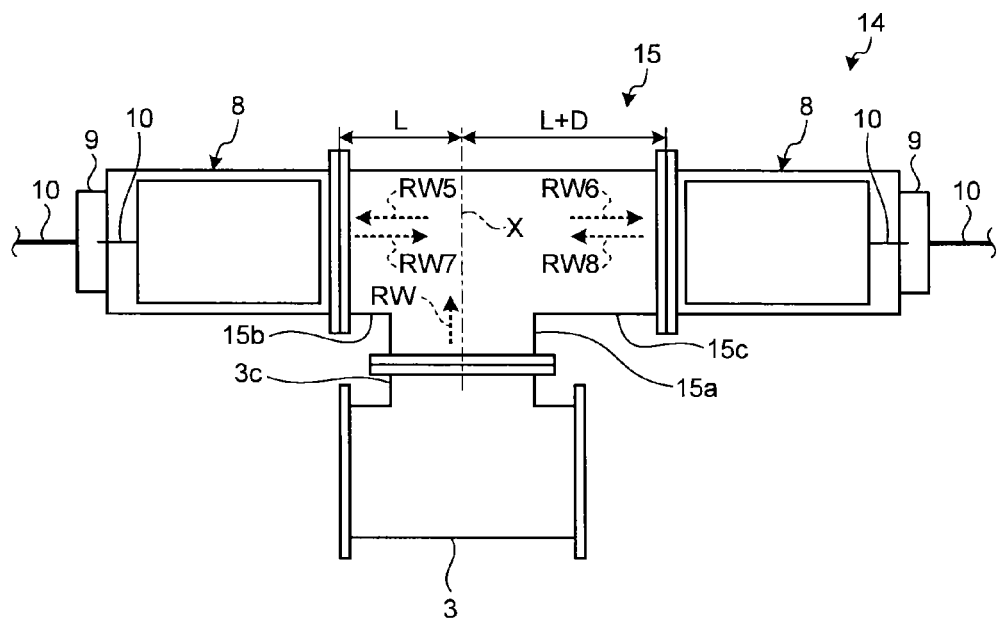
FIG. 9 is a schematic diagram illustrating a power regeneration device according to a third embodiment.

FIG. 9 is a schematic diagram illustrating a power regeneration device according to a third embodiment. As shown in FIG. 9, a power regeneration device 14 has a configuration in which the T-branch waveguide 13 in the power regeneration device 12 in the second embodiment is replaced with a T-branch waveguide 15. The T-branch waveguide 15 has a first port 15a connected to the third port 3c of the circulator 3, and a second port 15b and a third port 15c connected to two high frequency-to-DC converters 8, respectively.

In the T-branch waveguide 15, the length from the center axis X of the first port 15a to the second port 15b is L, and the length from the center axis X to the third port 15c is L+D. Accordingly, the T-branch waveguide 15 has an asymmetric T shape in which the third port 15c has an offset of D. D is set to $\lambda g/4$, where $\lambda g$ is the wavelength of the reflected microwaves RW in the T-branch waveguide 15.

The operation of the power regeneration device 14 will next be described. In the T-branch waveguide 15, the reflected microwaves RW extracted by the circulator 3 and outputted from its third port 3c branch in two directions and are outputted from the second port 15b and the third port 15c as reflected microwaves RW5 and reflected microwaves RW6, respectively. Then the high frequency-to-DC converters 8 connected to the second port 15b and the third port 15c convert the outputted reflected microwaves RW5 and RW6 into DC powers, and the DC powers are outputted to the voltage controllers 9 through the power lines 10, respectively. Then each voltage controller 9 controls the voltage of the inputted DC power to a predetermined voltage, and outputs the power to the high frequency generator 1 through each power line 10.

Part of the reflected microwaves RW5 and part of the reflected microwaves RW6 may be reflected inside the respective high frequency-to-DC converters 8 and may return as reflected microwaves RW7 and RW8. However, since D is set to $\lambda g/4$ as described above, the reflected microwaves RW6 and RW8 travel distances longer by D than the reflected microwaves RW5 and RW7. In consideration of this fact, the path difference between the reflected microwaves RW7 and RW8 is $2D=\lambda g/2$, and the phase difference is $(2\pi/\lambda g)\times(\lambda g/2)=\pi$. Therefore, when the reflected microwaves RW7 and RW8 are combined, they cancel each other out. In this manner, the reflected microwaves RW7 and RW8 are prevented from being outputted from the first port 15a of the T-branch waveguide 15.

The offset D of the T-branch waveguide 15 is not limited to $\lambda g/4$. For example, when rectification is performed in the rectifying units 82b of the rectenna elements 82 in the high frequency-to-DC converters 8, harmonic components associated with the frequency of the reflected microwaves are generated, as described above. Generally, these harmonic components are blocked by the input filters 82ba of the rectifying units 82b. However, if no input filters 82ba are provided or high intensity harmonic components are generated, these harmonic components (particularly, a second harmonic component) may leak and may be outputted from the antenna probes 82a as second harmonic microwaves (hereinafter referred to as second harmonics). If the offset D of the T-branch waveguide 15 is set to $\lambda g/6$, the second harmonics outputted from the two high frequency-to-DC converters 8 cancel each other out when they combine in the T-branch waveguide 15 and are therefore prevented from being outputted from the first port 15a of the T-branch waveguide 15.

More specifically, the path difference between the second harmonics outputted from the second port 15b and the second harmonics outputted from the third port 15c is the sum of $\lambda g/6$, which is the path difference that occurs when the two-branched reflected microwaves that cause the second harmonics are inputted to the high frequency-to-DC converters 8, and $2\times(\lambda g/6)=\lambda g/3$, which is the path difference that occurs when the respective second harmonics are outputted from the high frequency-to-DC converters 8 and combine, i.e., the path difference is $\lambda g/6+\lambda g/3=\lambda g/2$. Since the frequency of the second harmonics is two times the frequency of the original reflected microwaves, the path difference for the offset D is two times that of the original reflected microwaves. Therefore, the phase difference between the two second harmonics is $(2\pi/\lambda g)\times(\lambda g/2)=\pi$, and the second harmonics cancel each other out when they combine.

In the above embodiment, the T branch waveguide is used as a branching unit to branch the reflected microwaves to two waves. However, a combination of a plurality of T branch waveguides or a multi-branch waveguide with three or more branches may be used to cause the reflected microwaves to branch in a larger number of directions.

Fourth Embodiment

Figure 10:
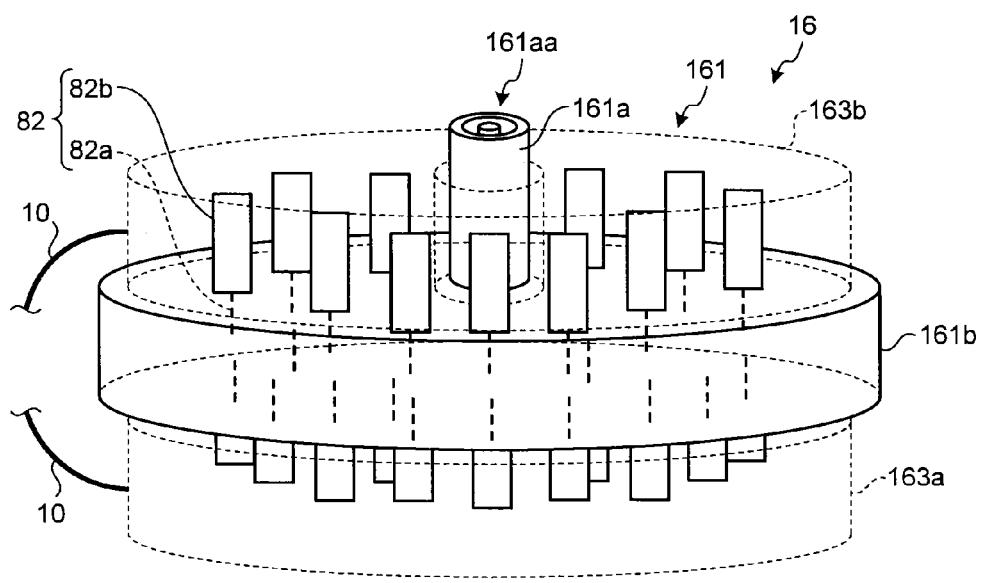
FIG. 10 is a schematic partially perspective view illustrating a high frequency-to-DC converter according to a fourth embodiment.

Another embodiment of the high frequency-to-DC converter that can be used for the power regeneration device according to the first embodiment or the second or third embodiment will next be described. FIG. 10 is a schematic partially perspective view illustrating a high frequency-to-DC converter according to a fourth embodiment. As shown in FIG. 10, a high frequency-to-DC converter 16 includes a waveguide 161 having a radial waveguide, a plurality of rectenna elements 82 each having an antenna probe 82a and a rectifying unit 82b, a disk-shaped casing 163a and a donut-shaped casing 163b. The casings 163a and 163b contain the rectifying units 82b. Each rectifying unit 82b is connected to power lines 10.

Figure 11:
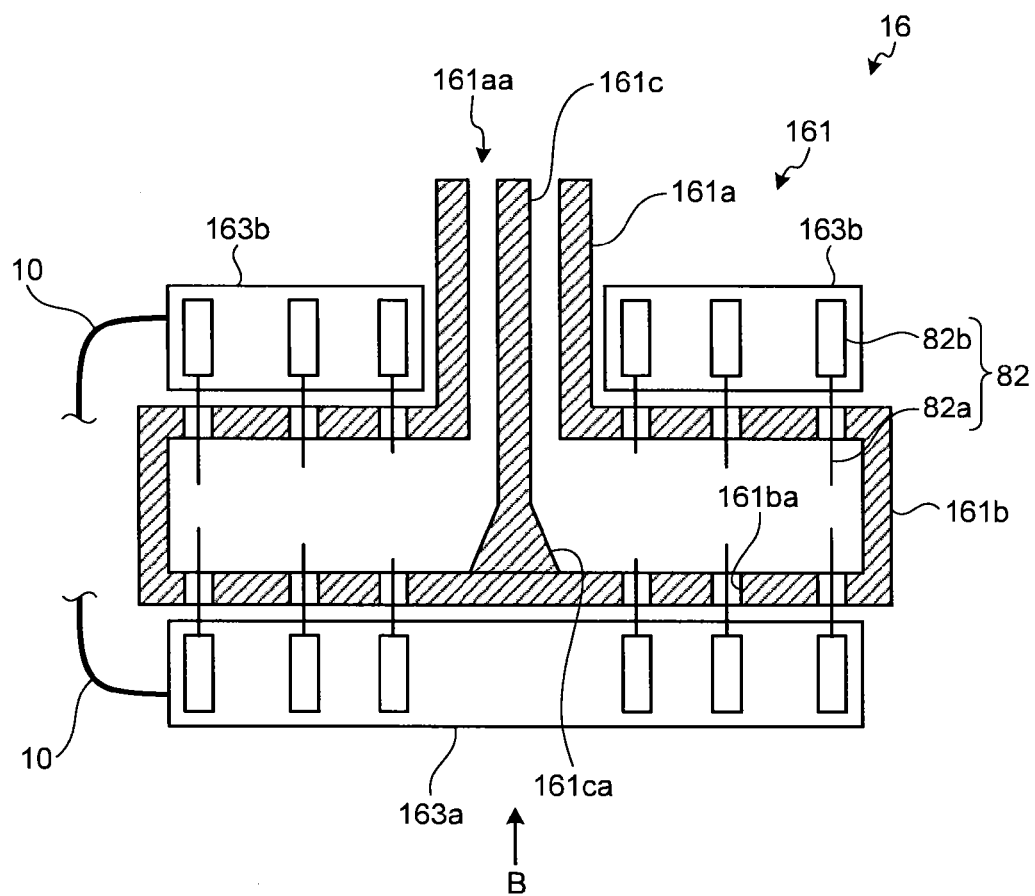
FIG. 11 is a cross-sectional view of the high frequency-to-DC converter shown in FIG. 10.

FIG. 11 is a cross-sectional view of the high frequency-to-DC converter 16 shown in FIG. 10, taken along a plane containing the center axis of the waveguide 161. As shown in FIGS. 10 and 11, the waveguide 161 includes: a cylindrical waveguide section 161a connected to the circulator 3 or the T-branch waveguide 13 or 15 and having an opening 161aa with a cross sectional area comparable to the cross-sectional area of the circulator 3 or the T-branch waveguide 13 or 15; a hollow disk-shaped radial waveguide section 161b connected to the cylindrical waveguide section 161a and having an inner diameter larger than the inner diameter of the cylindrical waveguide section 161a; and an inner conductor 161c provided along the center axis of the cylindrical waveguide section 161a and the radial waveguide section 161b. A large number of holes 161ba are formed in the opposite principal surfaces of the radial waveguide section 161b. The rectenna elements 82 are distributed and arranged at positions corresponding to the positions of the holes 161ba of the radial waveguide section 161b. The antenna probes 82a are inserted into the holes 161ba and protrude inside the radial waveguide section 161b.

Figure 12:
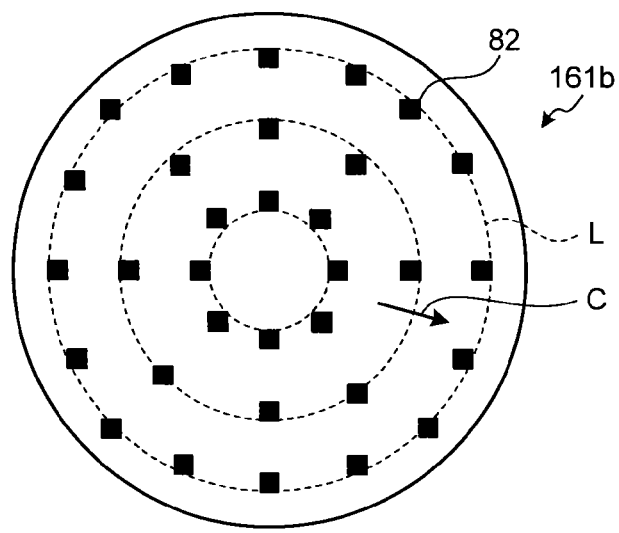
FIG. 12 is an explanatory diagram illustrating arrangement of rectenna elements in a radial waveguide section shown in FIG. 10.

FIG. 12 is an explanatory diagram illustrating arrangement of the rectenna elements 82 in the radial waveguide section 161b shown in FIG. 10. FIG. 12 is a diagram when a principal surface of the radial waveguide section 161b in FIG. 10 is viewed in a direction of arrow B. Reference sign L represents a plurality of concentric circles about the center axis of the radial waveguide section 161b, and reference sign C represents the radial direction of the radial waveguide section 161b. As shown in FIG. 12, rectenna elements 82 are arranged radially in the radial direction C on the plurality of concentric circles L on one surface of the radial waveguide section 161b. Rectenna elements 82 are arranged radially in the radial direction C also on concentric circles on the other surface of the radial waveguide section 161b.

The lengths of the respective antenna probes 82a are set, as shown in FIG. 11, so as to decrease toward the center axis of the radial waveguide section 161b on which the electric field intensity is high and to increase in the radial direction C in which the electric field intensity decreases. The lengths of antenna probes 82a provided on the same concentric circle L are substantially the same.

The operation of the high frequency-to-DC converter 16 will next be described. The reflected microwaves inputted from the opening 161aa of the cylindrical waveguide section 161a are converted to an isotropic electric field intensity distribution around the inner conductor 161c when transmitted through the cylindrical waveguide section 161a. When the reflected microwaves reach the radial waveguide section 161b, they spread with their intensity being distributed isotropically about the inner conductor 161c and then are transmitted in the radial direction C. The inner conductor 161c has an expanding conical section 161ca formed at its bottom, so that the reflected microwaves can spread smoothly from the cylindrical waveguide section 161a toward the radial waveguide section 161b with small losses.

As described above, the reflected microwaves spread in the radial waveguide section 161b with their intensity being distributed isotropically. Therefore, by simply arranging rectenna elements 82 having antenna probes 82a with substantially the same length on a concentric circle, the intensities of the reflected microwaves received by the respective rectenna elements 82 can become equal. Since the lengths of the antenna probes 82a increase in the radial direction C, the intensities of the reflected microwaves received by the respective antenna probes 82a can become equal, and this can prevent a large AC power load from being applied to a certain rectifying unit 82b.

The radial waveguide section 161b also functions as a branching unit that branches the reflected microwaves with isotropic intensity distribution. With the radial waveguide section 161b, the electric power of the inputted reflected microwaves is dispersed isotropically in all circumferential directions, and the power density can be further reduced as compared to that in an N-branch unit (N is an integer equal to or larger than 2) such as the T-branch waveguides 13 and 15 described above. Therefore, with the high frequency-to-DC converter 16, the dynamic range of the input power of microwaves is widened.

Fifth Embodiment

In each of the above embodiments, a power regeneration device using rectenna elements is used, but the present invention is not limited thereto. A power regeneration device using another device that can convert high-frequency waves to direct current may be used. A description will next be given of a fifth embodiment of the present invention, i.e., an embodiment of a power regeneration device using a microwave tube.

Figure 13:
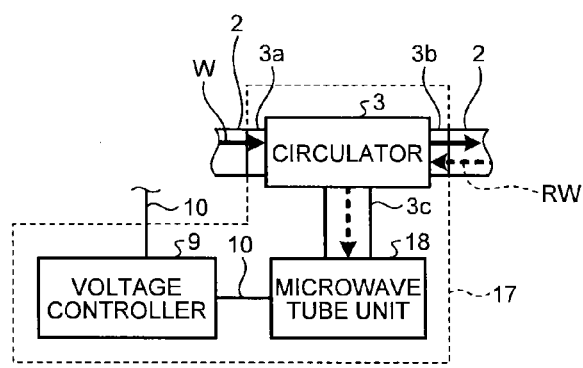
FIG. 13 is a block diagram illustrating a configuration of a power regeneration device according to a fifth embodiment.

FIG. 13 is a block diagram illustrating a configuration of a power regeneration device according to the fifth embodiment. As shown in FIG. 13, a power regeneration device 17 has a configuration in which the high frequency-to-DC converter 8 in the power regeneration device 11 shown in FIG. 1 is replaced with a microwave tube unit 18. The microwave tube unit 18 uses a microwave tube for converting the reflected microwaves RW extracted by the circulator 3 into DC power and has a function that is the reverse of the function of the high frequency generator 1. Such microwave tube unit 18 can be implemented using various kinds of vacuum tubes, such as a magnetron, a klystron, and a traveling-wave tube (TWT), which can generate microwaves.

Since the power regeneration device 17 uses the microwave tube unit 18, high-power reflected microwaves RW can be converted to DC power using a simple structure.

Sixth Embodiment

A high frequency heating device according to a sixth embodiment of the invention will next be described. The high frequency heating device according to the sixth embodiment has substantially the same configuration as that of the high frequency heating device 100 according to the first embodiment but further includes a power storage unit.

Figure 14:
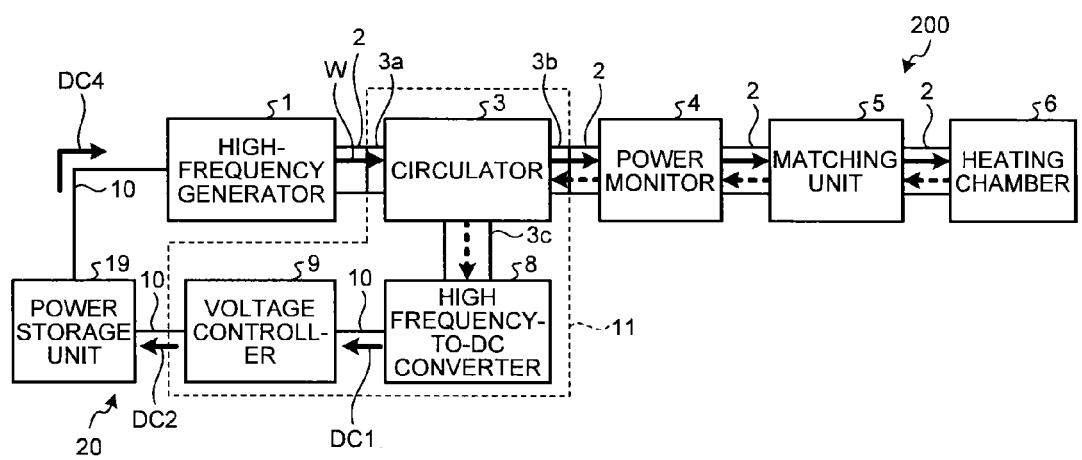
FIG. 14 is a block diagram illustrating a configuration of a high frequency heating device according to a sixth embodiment.

FIG. 14 is a block diagram illustrating a configuration of the high frequency heating device according to the sixth embodiment. As shown in FIG. 14, a high frequency heating device 200, as in the high frequency heating device 100 shown in FIG. 1, includes a high frequency generator 1, a heating chamber 6, a waveguide 2, a circulator 3, a power monitor 4, a matching unit 5, a high frequency-to-DC converter 8, and a voltage controller 9. The circulator 3, the high frequency-to-DC converter 8, and the voltage controller 9 constitute a power regeneration device 11. The high frequency-to-DC converter 8 and the voltage controller 9 are connected to each other through a power line 10.

The high frequency heating device 200 further includes a power storage unit 19. The voltage controller 9 and the power storage unit 19 are connected to each other through the power line 10, and the power regeneration device 11 and the power storage unit 19 constitute a power storage system 20. The power storage unit 19 of the power storage system 20 and the high frequency generator 1 are connected to each other through the power line 10. The power storage unit 19 is implemented using a secondary battery such as a lithium ion battery or a capacitor such as an electric double layer capacitor, and no particular limitation is imposed on the type of the power storage unit 19.

In the high frequency heating device 200, as in the high frequency heating device 100, the high frequency-to-DC converter 8 of the power regeneration device 11 converts the reflected microwaves RW outputted from the heating chamber 6 into DC power DC1, and the voltage controller 9 outputs DC power DC2 having a voltage controlled to a predetermined value. However, the high frequency heating device 200 is different from the high frequency heating device 100 in that the power storage unit 19 stores the outputted DC power DC2 and appropriately outputs a predetermined amount of DC power DC4 from the stored power to the high frequency generator 1 through the power line 10.

The power storage system 20 operates, for example, in the following manner. When the high frequency heating device 200 operates normally, the power storage system 20 stores the DC power DC2. For example, when a larger amount of electric power is required, i.e., the high frequency heating device 200 operates at high power or for a long time, the power storage system 20 operates such that a larger amount of DC power DC4 is outputted to the high frequency generator 1. Alternatively, the power storage system 20 may operate such that the stored power is supplied to another device. As described above, the high frequency heating device 200 including the power storage system 20 can flexibly and efficiently utilize the electric power of the reflected microwaves RW that has conventionally been disposed of as heat. In the sixth embodiment, the power storage unit 19 is provided to the high frequency heating device 200 but may be provided as an external unit.

Seventh Embodiment

Figure 15:
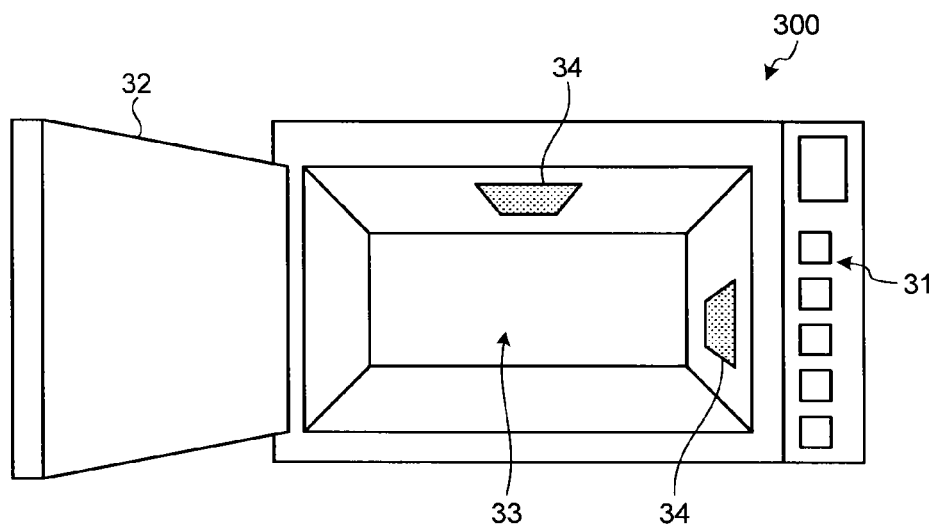
FIG. 15 is a schematic outline view of a microwave oven according to a seventh embodiment with its door open.

A description will next be given of a household or industrial-use microwave oven, which is a high frequency heating device according to a seventh embodiment of the invention. FIG. 15 is a schematic outline view of a microwave oven according to the seventh embodiment with its door open. As shown in FIG. 15, a microwave oven 300 includes: a control display unit 31 having various control buttons, such as a start button, for setting various operations and a display for displaying an operation menu and operating time, etc.; a door 32; and a heating chamber 33. Openings 34 for emitting microwaves into the heating chamber 33 are provided in the inner upper and side surfaces of the heating chamber 33. If necessary, a turntable may be provided in the heating chamber 33.

Figure 16:
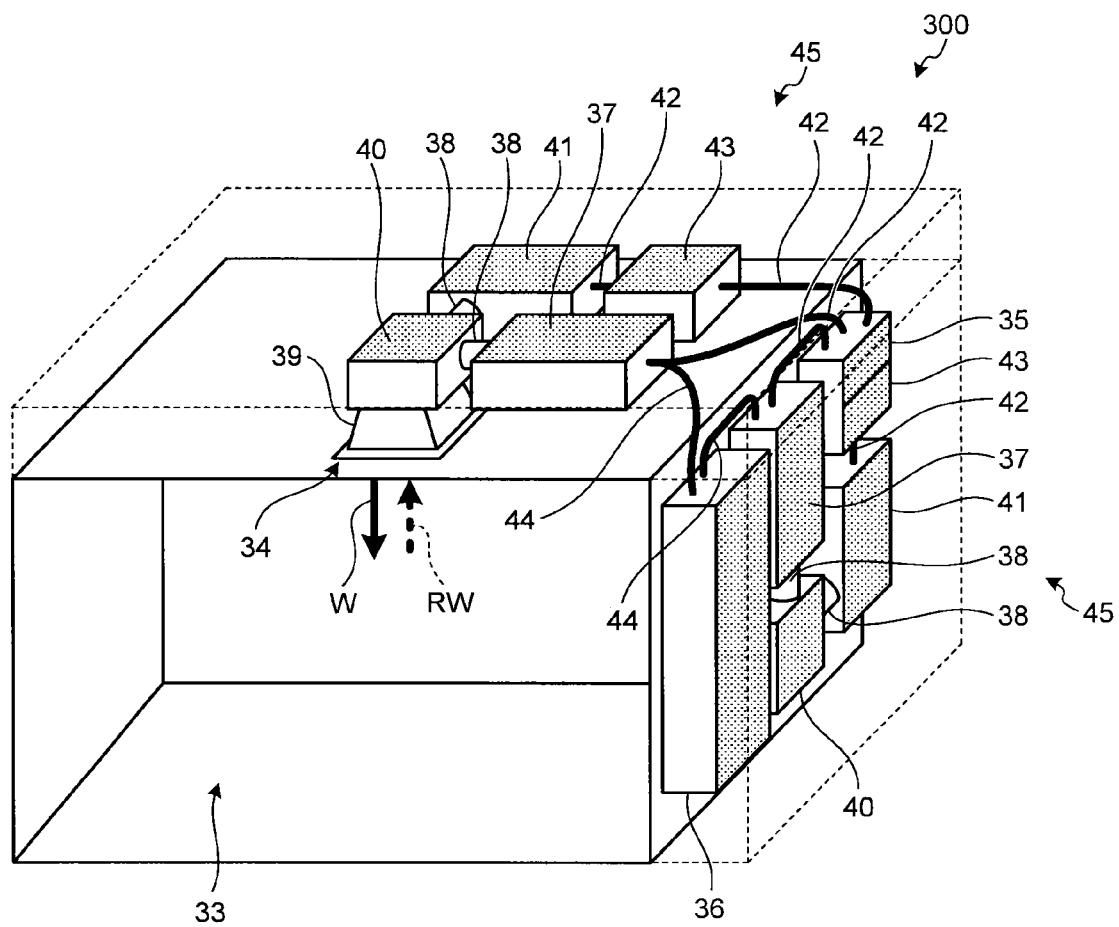
FIG. 16 is a schematic perspective view illustrating an internal configuration of the microwave oven shown in FIG. 15.

FIG. 16 is a schematic perspective view illustrating an internal configuration of the microwave oven 300 shown in FIG. 15. As shown in FIG. 16, the microwave oven 300 includes a power source circuit 35 to which electric power is supplied from, for example, a household socket, and a main control unit 36 connected to the control display unit 31. On the top of the heating chamber 33, the microwave oven 300 further includes a high-frequency wave generator 37, a coaxial cable 38 and a waveguide antenna 39 that are used to transmit microwaves from the high-frequency wave generator 37 to the heating chamber 33, and a circulator 40 provided on a transmission path composed of the coaxial cable 38 and the waveguide antenna 39. The waveguide antenna 39 opens toward the heating chamber 33 through one of the openings 34. On the top of the heating chamber 33, the microwave oven 300 further includes a high frequency-to-DC conversion circuit 41 connected to the circulator 40 through a coaxial cable 38, and a voltage control circuit 43 connected to the high frequency-to-DC conversion circuit 41 through a power line 42. The voltage control circuit 43 is connected to the power source circuit 35 through the power line 42.

On a side of the heating chamber 33, the microwave oven 300 further includes a high-frequency wave generator 37, a waveguide antenna (not shown), a circulator 40, a high frequency-to-DC conversion circuit 41; a voltage control circuit 43, and coaxial cables 38 and power lines 42 for appropriately connecting these members. The waveguide antenna (not shown) opens toward the heating chamber 33 through the opening 34 on the side surface of the heating chamber 33 (see FIG. 15). The high-frequency wave generators 37 are connected to the main control unit 36 through control lines 44 and to the power source circuit 35 through the power lines 42. The circulators 40, the high frequency-to-DC conversion circuits 41, and the voltage control circuits 43 constitute power regeneration devices 45.

The operation of the microwave oven 300 will next be described. According to the operation of the various setting buttons and the start button in the control display unit 31, the main control unit 36 operates the high-frequency wave generators 37 through the control lines 44 to generate microwaves W. DC power is supplied from the power source circuit 35 to the high-frequency wave generators 37 through the power lines 42. The microwaves W generated by the high-frequency wave generators 37 are sequentially transmitted through coaxial cables 38, the circulators 40, and the waveguide antennas 39, and the waveguide antennas 39 emit the microwaves W to the heating chamber 33 through the openings 34. The microwaves W are absorbed by a heating object contained in the heating chamber 33, and the heating object is thereby heated. The microwaves W emitted to the heating chamber 33 but not used for heating return to the waveguide antennas 39 as reflected microwaves RW.

Then the reflected microwaves RW are regenerated as DC power by the power regeneration devices 45 in the same manner as in the embodiments described above. More specifically, the circulators 40 extract the reflected microwaves RW returning from the waveguide antennas 39, and the coaxial cables 38 transmit the extracted reflected microwaves RW to the high frequency-to-DC conversion circuits 41. The high frequency-to-DC conversion circuits 41 convert the reflected microwaves RW into DC power and output the DC power to the voltage control circuits 43 through the power lines 42. The voltage control circuits 43 output the DC power from the high frequency-to-DC conversion circuits 41 to the power source circuit 35 through the power lines 42 as DC power with a desired controlled voltage. The power source circuit 35 uses the DC power regenerated by the power regeneration devices 45 as, for example, the power for generating the microwaves W or the power used for, for example, the control display unit 31. The microwave oven 300 may include an electric heater for oven-heating the heating object, and the regenerated DC power may be used as the power for the electric heater.

As described above, since the microwave oven 300 includes the power regeneration devices 45, the electric power of the reflected microwaves RW that has conventionally been simply disposed of as heat can be effectively utilized, and efficient use of energy can thereby be achieved. Therefore, the microwave oven 300 allows a reduction in the amount of electric power used in a house or a store and is therefore preferred in terms of energy saving and ecology and in terms of savings in the cost of electricity.

For example, generators including magnetrons may be used as the high-frequency wave generators 37, but this is not a limitation. For example, generators composed of a microwave oscillator and a solid-state amplifier that use semiconductor elements such as transistors may be used as the high-frequency wave generators 37. Such generators are compact and light weight, and a low voltage (about several tens V) can be used as their driving voltage. Therefore, a high-voltage (several kV) circuit, which is used for a magnetron, is not required, and frequency drift of the microwaves does not occur. In addition, such generators have semipermanent service life and are therefore more preferred. Voltage control circuits having the same structure as the structure of the voltage controller 9 shown in FIG. 7 can be used as the voltage control circuits 43.

Rectifying units having the same structure as the structure of the rectifying units 82b shown in FIG. 6 can be used as the high frequency-to-DC conversion circuits 41. However, high frequency-to-DC conversion circuits having the following configurations may be used.

Figure 17:
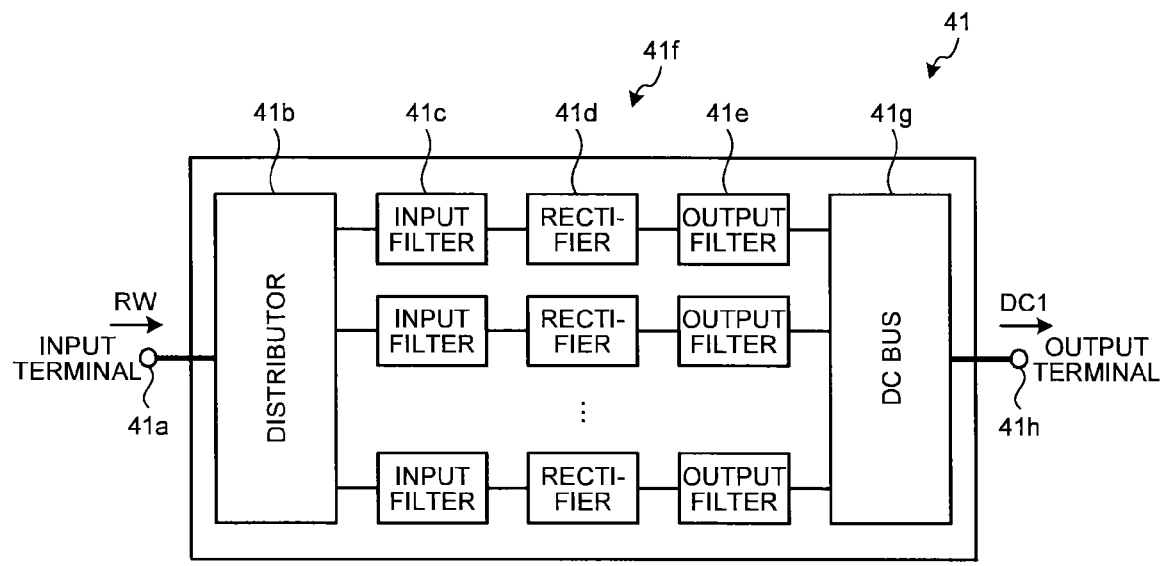
FIG. 17 is a block diagram illustrating an exemplary configuration of a high frequency-to-DC conversion circuit.

FIG. 17 is a block diagram illustrating an exemplary configuration of the high frequency-to-DC conversion circuit. As shown in FIG. 17, this high frequency-to-DC conversion circuit 41 includes: an input terminal 41a to which the reflected microwaves RW are inputted; a distributor 41b that distribute the electric power of the inputted reflected microwaves RW; a plurality of rectifying units 41f connected to the distributor 41b, each rectifying unit 41f including an input filter 41c, a rectifier 41d, and an output filter 41e that are sequentially connected; a DC bus 41g that is connected to the rectifying units 41f and collects the output power outputted from the rectifying units 41f; and an output terminal 41h that is connected to the DC bus 41g and outputs the collected power as DC power DC 1. Each of the rectifying units 41f has the same function as the function of the rectifying unit 82b shown in FIG. 6.

In this high frequency-to-DC conversion circuit 41, the distributor 41b divides the electric power of the inputted reflected microwaves RW and distributes them to the rectifying units 41f, and each of the rectifying units 41f converts the distributed power into DC power. Therefore, high-power reflected microwaves RW can be received using low-cost rectifying units 41f with small permissible input power.

Figure 18:
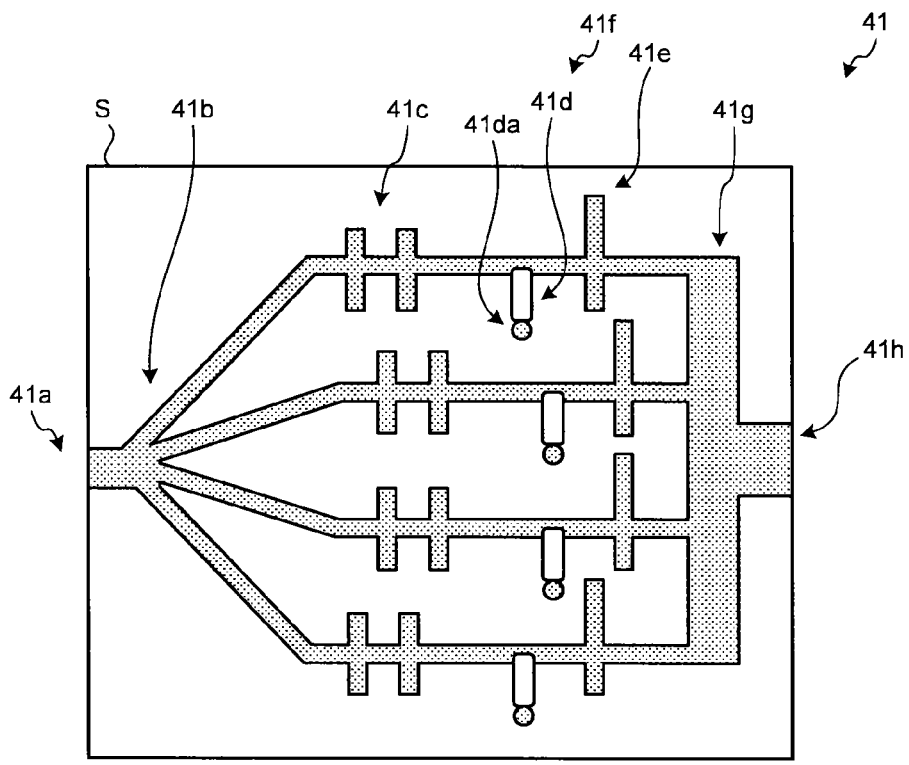
FIG. 18 is a diagram illustrating an example of the high frequency-to-DC conversion circuit shown in FIG. 17, the circuit being configured using microstrip lines.

FIG. 18 is a diagram illustrating an example of the high frequency-to-DC conversion circuit 41 shown in FIG. 17, the circuit being configured using microstrip lines. In FIG. 18, the distributor 41b is a four-way distributor. As shown in FIG. 18, the high frequency-to-DC conversion circuit 41 includes an input terminal 41a, a distributor 41b, a plurality of rectifying units 41f, a DC bus 41g, and an output terminal 41h that are formed as microstrip lines formed on a dielectric substrate S. The rectifiers 41d in the rectifying units 41f are diodes, and one ends of the diodes are grounded to a rear-side conductor of the dielectric substrate S via through holes 41da. As described above, the high frequency-to-DC conversion circuit 41 has a simple structure and can be easily produced using microstrip lines.

Figure 19:
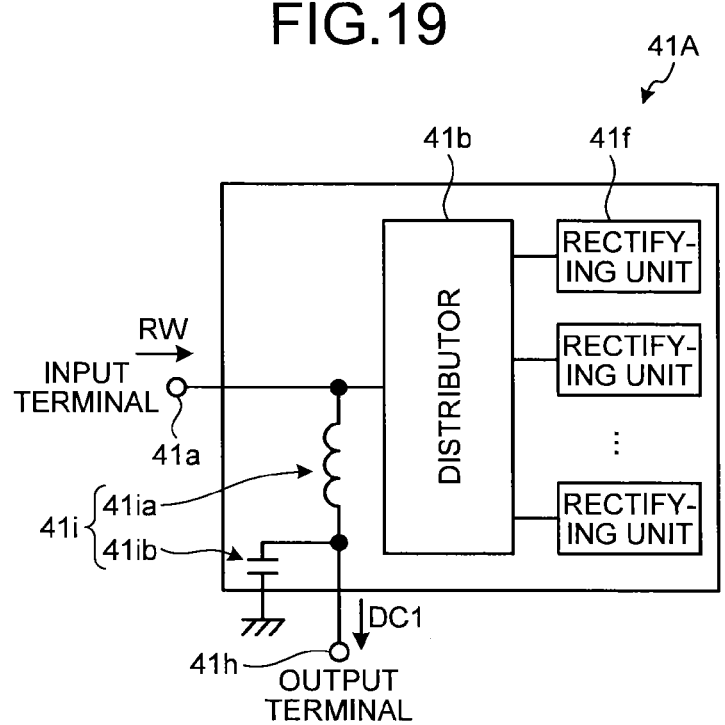
FIG. 19 is a block diagram illustrating a modification of the high frequency-to-DC conversion circuit shown in FIG. 17.

FIG. 19 is a block diagram illustrating a modification of the high frequency-to-DC conversion circuit shown in FIG. 17. As shown in FIG. 19, a high frequency-to-DC conversion circuit 41A includes: an input terminal 41a to which the reflected microwaves RW are inputted; a distributor 41b that distributes the electric power of the inputted reflected microwaves RW; a plurality of rectifying units 41f connected to the distributor 41b; a low-pass filter 41i connected between the input terminal 41a and the distributor 41b and composed of an inductor 41ia and a capacitor 41ib; and an output terminal 41h connected to the low-pass filter 41i. Each of the rectifying units 41f includes an input filter 41c, a rectifier 41d, and an output filter 41e that are connected sequentially, as shown in FIG. 17.

In this high frequency-to-DC conversion circuit 41A, the distributor 41b divides the electric power of the inputted reflected microwaves RW and distributes them to the respective rectifying units 41f, and the rectifying units 41f convert the distributed power into DC power. Then the distributor 41b collects the DC power from the rectifying units 41f and outputs the collected power from the output terminal 41h as DC power DC1. AC components contained in the DC power DC1 are removed by the low-pass filter 41i. In the high frequency-to-DC conversion circuit 41A, the direct currents are collected by the distributor 41b without using the DC bus 41g. Therefore, the space for components can be reduced, and the size of the high frequency-to-DC conversion circuit 41A can be reduced.

Figure 20:
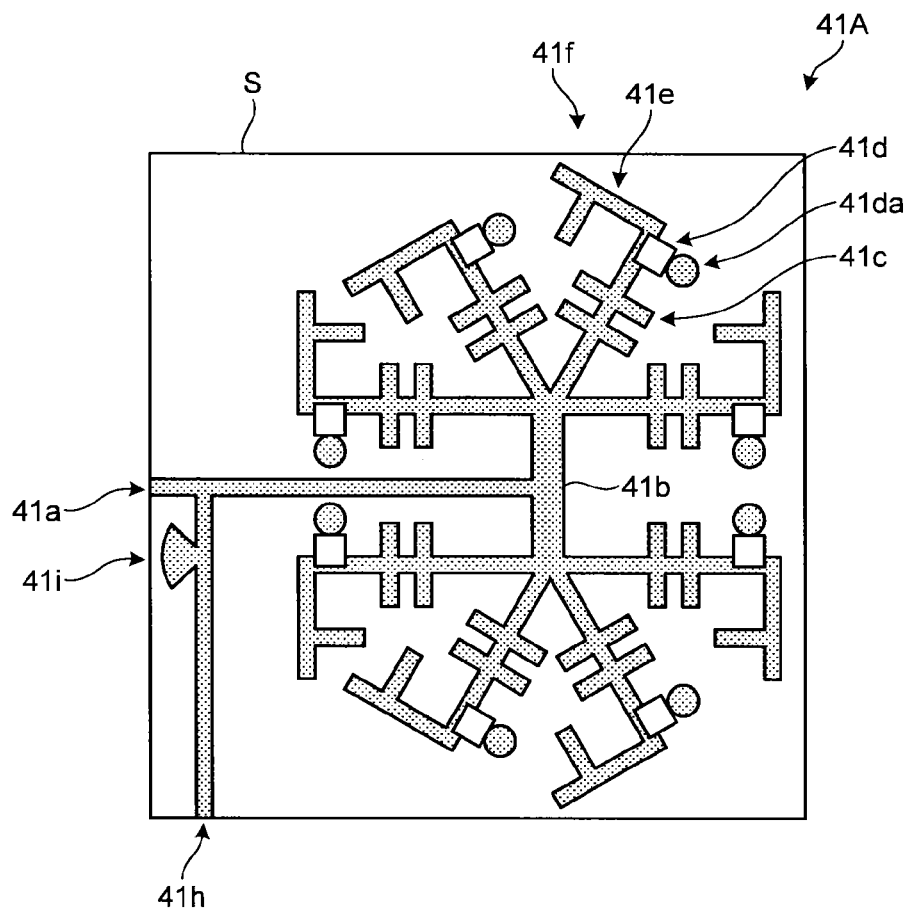
FIG. 20 is a diagram illustrating an example of the high frequency-to-DC conversion circuit shown in FIG. 19, the circuit being configured using microstrip lines.

FIG. 20 is a diagram illustrating an example of the high frequency-to-DC conversion circuit 41A shown in FIG. 19, the circuit being formed by microstrip lines. In FIG. 20, the distributor 41b is an eight-way distributor. As shown in FIG. 20, the high frequency-to-DC conversion circuit 41A includes an input terminal 41a, a distributor 41b, a plurality of rectifying units 41f, a low-pass filter 41i formed as a radial stub, and an output terminal 41h that are formed as microstrip lines on a dielectric substrate S. One ends of rectifiers 41d shunt-connected to microstrip lines are grounded to a rear-side conductor of the dielectric substrate S via through holes 41da. As described above, the high frequency-to-DC conversion circuit 41A has a simple structure and can be easily produced using microstrip lines, and its size can be reduced. In FIGS. 19 and 20, a band-pass filter may be used instead of the low-pass filter 41i.

The microwave oven 300 according to the seventh embodiment may include an electric heater for oven heating, as described above. Electronic circuits composed of semiconductor elements may be used as the high-frequency wave generators 37 and the high frequency-to-DC conversion circuits 41. When oven heating is performed, the temperature inside the heating chamber 33 can reach about 300° C. This temperature is higher than the melting point of general lead-free solder being 220° C. and the bonding temperature of general semiconductor elements being approximately 150° C. However, in the microwave oven 300, the high-frequency wave generators 37 and the high frequency-to-DC conversion circuits 41 are disposed outside the heating chamber 33 and are therefore not subjected to high temperature during oven heating. Therefore, solder connected portions of the high-frequency wave generators 37 and the high frequency-to-DC conversion circuits 41 are prevented from melting, and the semiconductor elements are prevented from thermal runaway.

In the microwave oven 300 according to the seventh embodiment, a power storage unit may be further connected to the power regeneration devices 45 to form a power storage system so that the electric power stored can be used for an internal electric unit of the microwave oven 300 or an external electric device.

Each of the above embodiments relates to a high frequency heating device in which microwaves having a frequency of, for example, 2.4 to 2.5 GHz are used to heat a heating object containing water. However, the frequency of the high-frequency waves can be appropriately set according to the absorption band of the heating object. Further, the present invention is not limited to the high frequency heating device and is applicable to other high frequency devices that use high-frequency waves, such as particle accelerators, plasma generation devices used for semiconductor production devices etc., and radio communication devices such as mobile phones. The frequency of the high-frequency waves used in each device is appropriately selected according to its application. For example, in a plasma generation device for sputtering used in a semiconductor production device, high-frequency waves having a frequency of an integer multiple of 13.56 MHz are used. In mobile phones, high-frequency waves in an 800 MHz to 2 GHz band are used. A radio communication device, which is another embodiment of the present invention, will next be described.

Eighth Embodiment

Figure 21:
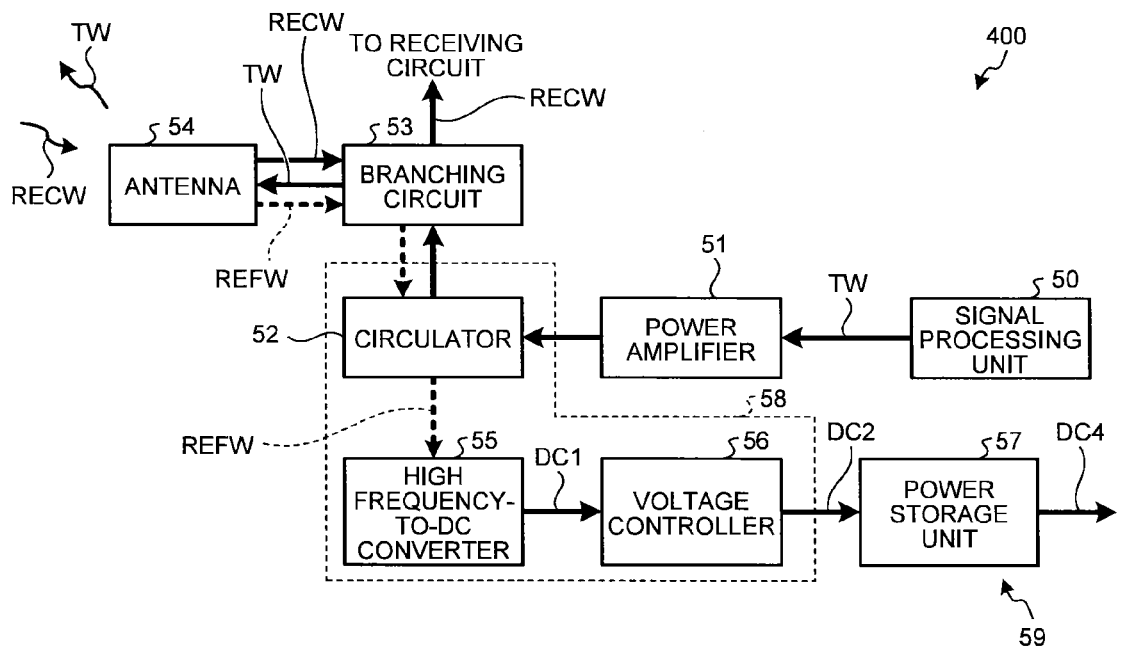
FIG. 21 is a block diagram illustrating a configuration of a main part of a radio communication device according to an eighth embodiment.

FIG. 21 is a block diagram illustrating a configuration of a main part of a radio communication device according to an eighth embodiment. As shown in FIG. 21, a radio communication device 400 includes: a signal processing unit 50; a power amplifier 51 connected to the signal processing unit 50; a circulator 52 connected to the power amplifier 51; a branching circuit 53 connected to the circulator 52; an antenna 54 connected to the branching circuit 53 and serving as a high-frequency load; a high frequency-to-DC converter 55 connected to the circulator 52; a voltage controller 56 connected to the high frequency-to-DC converter 55; and a power storage unit 57 connected to the voltage controller 56. The circulator 52, the high frequency-to-DC converter 55, and the voltage controller 56 constitute a power regeneration device 58, and the power regeneration device 58 and the power storage unit 57 constitute a power storage system 59.

The operation of the radio communication device 400 will next be described. First, the signal processing unit 50 outputs transmission waves TW, which are high-frequency signal waves having a predetermined carrier frequency and containing, for example, audio signals, to the power amplifier 51. The power amplifier 51 amplifies the transmission waves TW and outputs the amplified waves to the circulator 52. The circulator 52 outputs the transmission waves TW to the branching circuit 53. The branching circuit 53 outputs the transmission waves TW to the antenna 54. The antenna 54 transmits the transmission waves TW to base stations etc. The antenna 54 is also used to receive reception waves RECW, which are high-frequency signal waves transmitted from a base station, having a predetermined carrier frequency, and containing, for example, audio signals, and then outputs the received waves to the branching circuit 53. The branching circuit 53 outputs the reception waves RECW to a receiving circuit. More specifically, the branching circuit 53 has the function of separating the transmission waves TW and the reception waves RECW from each other.

Part of the transmission waves TW are reflected by the antenna 54 being a high-frequency load and inputted to the branching circuit 53 as reflected transmission waves REFW. The branching circuit 53 outputs the reflected transmission waves REFW having the same frequency as that of the transmission waves TW to the circulator 52.

In a circulator used in a conventional radio communication device, a resistor is provided at a port for outputting reflected transmission waves, and the electric power of the reflected transmission waves is disposed of as heat generated by the resistor, as disclosed in, for example, Non Patent Literature 3.

However, in the radio communication device 400, the circulator 52 is configured such that the reflected transmission waves REFW is outputted to the high frequency-to-DC converter 55. The high frequency-to-DC converter 55 converts the reflected transmission waves REFW into DC power DC1 and outputs the converted power to the voltage controller 56. The voltage controller 56 controls the voltage of the DC power DC1 to a predetermined voltage and outputs the power to the power storage unit 57 as DC power DC2. The power storage unit 57 stores the DC power DC2 and appropriately outputs a predetermined amount of DC power DC4 from the stored power to a main power source unit provided in the radio communication device 400.

More specifically, in the radio communication device 400, the power regeneration device 58 and the power storage system 59 allow the electric power of the reflected transmission waves REFW that has been conventionally disposed of simply as heat to be regenerated and utilized in an effective and flexible manner. Particularly, when the radio communication device 400 is of the rechargeable type, the operation duration time of the device that indicates the time until recharge is required becomes long, which is preferred.

Figure 22:
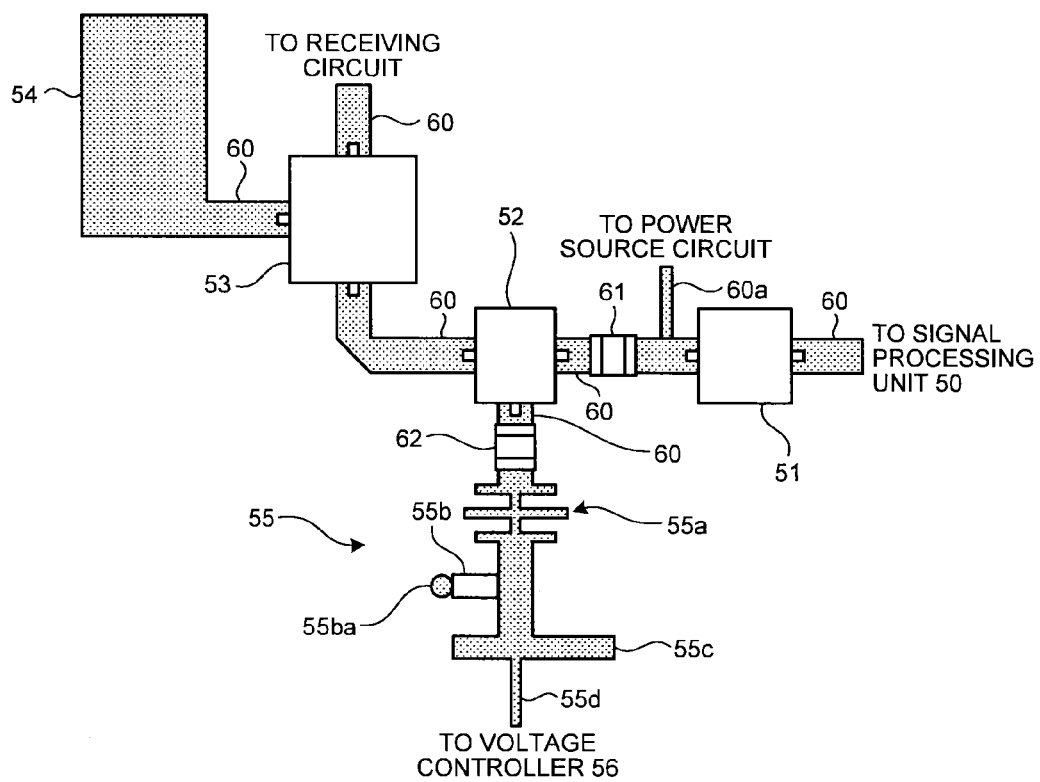
FIG. 22 is a diagram illustrating an example of the main part of the radio communication device shown in FIG. 21, the main part being configured using microstrip lines.
Figure 23:
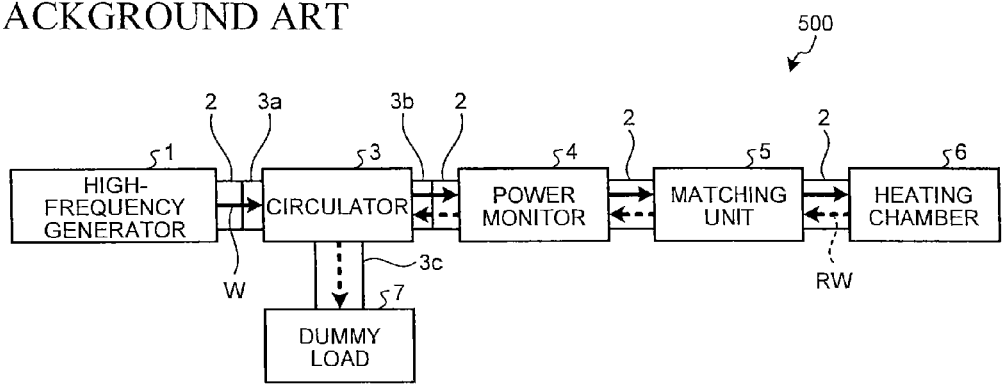
FIG. 23 is a block diagram illustrating a configuration of a high frequency heating device as an example of a high frequency device.

FIG. 22 is a diagram illustrating an example of a main part of the radio communication device shown in FIG. 21, the main part being formed by microstrip lines. In FIG. 22, a dielectric substrate is omitted. As shown in FIG. 22, the signal processing unit 50, the power amplifier 51, the circulator 52, the branching circuit 53, the antenna 54, and the high frequency-to-DC converter 55 are appropriately connected through microstrip lines 60, and the main part can be produced using a simple structure. A branched line 60a connected to the power source circuit of the main power source unit of the radio communication device 400 is provided in the microstrip line 60 connected to the power amplifier 51, and power for amplification is supplied to the power amplifier 51 through the branched line 60a. A DC-cut capacitor 61 is disposed between the power amplifier 51 and the circulator 52, and a DC-cut capacitor 62 is disposed between the circulator 52 and the high frequency-to-DC converter 55, so that unnecessary DC components are prevented from being inputted to the high frequency-to-DC converter 55 and the power amplifier 51. The high frequency-to-DC converter 55, as in the high frequency-to-DC conversion circuit 41 shown in FIG. 18, includes an input filter 55a, a rectifier 55b being a diode, an output filter 55c, and an output section 55d connected to the voltage controller 56, which are sequentially connected to one another. One end of the rectifier 55b is grounded to a rear-side conductor of the dielectric substrate through a through hole 55ba.

The radio communication device 400 according to the eighth embodiment includes the power storage unit 57 in addition to the main power source unit. However, the power storage unit 57 may not be provided, and the DC power DC2 outputted from the power regeneration device 58 may be directly used to recharge the main power source unit.

The present invention is not limited to the above embodiments. Any suitable combinations of the components in the above embodiments are included in the present invention. In addition, other embodiments and examples and operating techniques made by persons skilled in the art according to the above embodiments are also included in the present invention.

INDUSTRIAL APPLICABILITY

As described above, a power regeneration device and method, a power storage system and method, and a high frequency device according to the present invention are suitable for applications in which high-frequency power is regenerated and utilized efficiently.

REFERENCE SIGNS LIST 1, 37 HIGH FREQUENCY GENERATOR
2 WAVEGUIDE
3, 40, 52 CIRCULATOR
3a first port
3b SECOND PORT
3c THIRD PORT
4 POWER MONITOR
5 MATCHING UNIT
6, 33 HEATING CHAMBER
6b STIRRER FAN
6a TURNTABLE
6c ELECTRIC HEATER
6d INNER WALL
7 DUMMY LOAD
8, 16, 55 HIGH FREQUENCY-TO-DC CONVERTER
9, 56 VOLTAGE CONTROLLER
10 POWER LINE
11, 12, 14, 17, 45, 58 POWER REGENERATION DEVICE
13, 15 T-branch waveguide
13a, 15a FIRST PORT
13b, 15b SECOND PORT
13c, 15c THIRD PORT
18 MICROWAVE TUBE UNIT
19, 57 POWER STORAGE UNIT
20, 59 POWER STORAGE SYSTEM
31 CONTROL DISPLAY UNIT
32 DOOR
34 OPENING
35 POWER SOURCE CIRCUIT
36 MAIN CONTROL UNIT
38 COAXIAL CABLE
39 WAVEGUIDE ANTENNA
41, 41A HIGH FREQUENCY-TO-DC CONVERSION CIRCUIT
41a INPUT TERMINAL
41b DISTRIBUTOR
41c, 55a, 82ba INPUT FILTER
41d, 55b, 82bb RECTIFIER
41da, 55ba THROUGH HOLE 41e, 55c, 82bc OUTPUT FILTER
41f, 82b RECTIFYING UNIT
41g DC BUS
41h OUTPUT TERMINAL
41i LOW-PASS FILTER
41ia INDUCTOR
41ib CAPACITOR
42 POWER LINE
43 VOLTAGE CONTROL CIRCUIT
44 CONTROL LINE
50 SIGNAL PROCESSING UNIT
51 POWER AMPLIFIER
53 BRANCHING CIRCUIT
54 ANTENNA
55d OUTPUT SECTION
57 POWER STORAGE UNIT
60 MICROSTRIP LINE
60a BRANCHED LINE
61, 93 CAPACITOR
81 WAVEGUIDE
81a OPENING
81b HOLE
82 RECTENNA ELEMENT
82a ANTENNA PROBE
83, 163a, 163b CASING
91 COIL
92 DIODE
95 CONTROL UNIT
96 DRIVER
100, 200, 500 HIGH FREQUENCY HEATING DEVICE
161 WAVEGUIDE
161a CYLINDRICAL WAVEGUIDE SECTION
161aa OPENING
161b RADIAL WAVEGUIDE SECTION
161ba HOLE
161c INNER CONDUCTOR
161ca EXPANDING CONICAL SECTION
300 MICROWAVE OVEN
400 RADIO COMMUNICATION DEVICE
AC1, AC2 AC POWER
B ARROW
C RADICAL DIRECTION
DC1 to DC4 DC POWER
H HEAT
L CONCENTRIC CIRCLES
O HEATING OBJECT
RECW RECEPTION WAVE
REFW REFLECTED TRANSMISSION WAVE
RW, RW1 to RW8 REFLECTED MICROWAVE
S DIELECTRIC SUBSTRATE
TW TRANSMISSION WAVE
W MICROWAVE
X CENTER AXIS

The invention claimed is:

1. A power regeneration device, comprising:
an extraction unit provided on a transmission path, the transmission path being provided for transmitting a high-frequency wave from a high-frequency wave source to a high-frequency load, the extraction unit extracting a reflected high-frequency wave generated by reflecting the high-frequency wave from the high-frequency load via a reflected high-frequency wave transmission path;
a high frequency-to-DC converter for converting the reflected high-frequency wave extracted by the extraction unit into DC power; and
a branching unit that branches and outputs the reflected high-frequency wave extracted by the extraction unit to the reflected high-frequency wave transmission path,
wherein the high frequency-to-DC converter includes an antenna unit provided on the reflected high-frequency wave transmission path for receiving the reflected high-frequency wave and outputting AC power corresponding to the received reflected high-frequency wave; and
a rectifying unit for rectifying the AC power outputted from the antenna unit.

2. The power regeneration device according to claim 1, wherein the high frequency-to-DC-converter includes:
a plurality of antenna units, and
wherein the plurality of antenna units is distributed and arranged such that the reflected high-frequency wave transmitted through the reflected high-frequency wave transmission path is received by each of the antenna units.

3. The power regeneration device according to claim 1, wherein the reflected high-frequency wave transmission path includes a radial waveguide.

4. The power regeneration device according to claim 1, wherein the extraction unit includes a circulator having a first port to which the high-frequency wave generated by the high-frequency wave source is inputted, a second port from which the inputted high-frequency wave is outputted to the high-frequency load and to which the reflected high-frequency wave is inputted, and a third port from which the inputted reflected high-frequency wave is outputted.

5. The power regeneration device according to claim 1, further comprising:
a voltage control unit for controlling a voltage of the DC power outputted from the high frequency-to-DC converter to a predetermined voltage and outputs the power.

6. A power storage system, comprising:
the power regeneration device according to claim 1; and
a power storage unit for storing the DC power outputted from the power regeneration device.

7. A high frequency device, comprising:
a high-frequency wave source;
a high-frequency load;
a transmission path for transmitting a high-frequency wave from the high-frequency wave source to the high-frequency load; and
the power regeneration device according to claim 1, provided on the transmission path.

8. The high frequency device according to claim 7, wherein the high-frequency load is a heating chamber for high-frequency heating.

9. The high frequency device according to claim 7, wherein the high-frequency load is an antenna for receiving and transmitting a high-frequency signal wave.

10. A method of regenerating power, comprising:
an extracting step of extracting a reflected high-frequency wave on a transmission path, the transmission path being provided for transmitting a high-frequency wave from a high-frequency wave source to a high-frequency load, the reflected high-frequency wave being generated by reflecting the high-frequency wave from the high-frequency load via a reflected high-frequency wave transmission path;
a branching step of branching the extracted reflected high-frequency wave to the reflected high-frequency wave transmission path;
a high frequency-to-DC converting step of converting the extracted reflected high-frequency wave into DC power, wherein the high frequency-to-DC converting step includes: a receiving step of receiving the reflected high-frequency wave by an antenna unit provided on the reflected high-frequency wave transmission path and outputting AC power corresponding to the received reflected high-frequency wave; and a rectifying step of rectifying the outputted AC power.

11. The method of regenerating power according to claim 10, wherein, in the receiving step, the extracted reflected high-frequency wave is received by a plurality of antennas distributed and arranged on the reflected high-frequency wave transmission path while the extracted reflected high-frequency wave is transmitted through the reflected high-frequency wave transmission path.

12. The method of regenerating power according to claim 10, wherein, in the receiving step, the reflected high-frequency wave transmission path including a radial waveguide is used.

13. The method of regenerating power according to claim 10, further comprising:

a voltage controlling step of controlling a voltage of the DC power outputted in the high frequency-to-DC converting step to a predetermined voltage and outputting the power.

14. A method of storing power, comprising;

storing the DC power regenerated by the method of regenerating power according to claim 10.

* * * * *